United States Patent [19]
Hoarty

[11] Patent Number: 5,412,720
[45] Date of Patent: May 2, 1995

[54] INTERACTIVE HOME INFORMATION SYSTEM

[75] Inventor: W. Leo Hoarty, Morgan Hill, Calif.

[73] Assignee: ICTV, Inc., Santa Clara, Calif.

[21] Appl. No.: 877,325

[22] Filed: May 1, 1992

Related U.S. Application Data

[63] Continuation-in-part of Ser. No. 754,932, Sep. 10, 1991, Pat. No. 5,220,420, which is a continuation-in-part of Ser. No. 589,205, Sep. 27, 1990, Pat. No. 5,093,718.

[51] Int. Cl.⁶ .......................................... H04M 7/167
[52] U.S. Cl. ...................................... 380/15; 348/12; 348/13
[58] Field of Search ...................... 380/10, 15; 358/86; 455/4.1, 4.2, 5.1, 6.1, 6.2; 348/12, 13

[56] References Cited

U.S. PATENT DOCUMENTS

| | | | |
|---|---|---|---|
| 4,032,972 | 6/1977 | Saylor | 358/142 |
| 4,077,006 | 2/1978 | Nicholson | 325/308 |
| 4,077,066 | 2/1978 | Nicholson | 358/86 X |
| 4,081,831 | 3/1978 | Tang et al. | 358/114 |
| 4,245,245 | 1/1981 | Matsumoto et al. | 358/122 |
| 4,247,106 | 1/1981 | Jeffers et al. | 273/85 |
| 4,253,114 | 2/1981 | Tang et al. | 358/114 |
| 4,264,924 | 4/1981 | Freeman | 358/86 |
| 4,290,142 | 9/1981 | Schnee et al. | 455/3 |
| 4,367,557 | 1/1983 | Stern et al. | 455/4 |
| 4,450,477 | 5/1984 | Lovett | 358/86 |
| 4,454,538 | 6/1984 | Toriumi | 358/86 |
| 4,466,017 | 8/1984 | Banker | 358/120 |
| 4,471,380 | 9/1984 | Mobley | 358/120 |
| 4,491,983 | 1/1985 | Pinnow et al. | 455/612 |
| 4,506,387 | 3/1985 | Walter | 455/612 |
| 4,507,680 | 3/1985 | Freeman | 358/86 |
| 4,509,073 | 4/1985 | Baran et al. | 358/86 |
| 4,523,228 | 6/1985 | Banker | 358/120 |
| 4,533,948 | 8/1985 | McNamara et al. | 358/122 |
| 4,536,791 | 8/1985 | Campbell et al. | 380/15 |
| 4,538,174 | 8/1985 | Gargini et al. | 455/5.1 X |
| 4,567,517 | 1/1986 | Mobley | 358/120 |
| 4,573,072 | 2/1986 | Freeman | 358/86 |
| 4,591,906 | 5/1986 | Morales-Garza et al. | 358/84 |
| 4,602,279 | 7/1986 | Freeman | 358/86 |
| 4,616,263 | 10/1986 | Eichelberger | 358/185 |
| 4,627,105 | 12/1986 | Ohashi et al. | 455/612 |

(List continued on next page.)

OTHER PUBLICATIONS

"Proposal for a Hub Controlled Cable Television System Using Optical Fiber"; Schrock, Clifford et al.; IEEE Trans On CATV vol. 4 No. 2 Apr. 1979; pp. 70–77.

European Patent Application 0 477 786 A2.

Dukes, Stephen D., "Photonics for cable television
(List continued on next page.)

*Primary Examiner*—Tod R. Swann
*Attorney, Agent, or Firm*—Bromberg & Sunstein

[57] ABSTRACT

An interactive cable television system having a plurality of feeder servers, a plurality of home interface controllers and a feeder port. Home interface controllers are each equipped with a radio frequency input and a data communications link with a receiver and transmitter in the feeder port. A node control in communication with the feeder port determines whether a home interface controller is active and then assigns a feeder server to it. The feeder server provides one of a plurality of information signals from a headend depending on a selection input. Digitally compressed video signals are provided at the headend. The digitally compressed video signals can be provided by a modulator means at a carrier frequency greater than the upper frequency limit for carrying analog television signals with acceptable quality on the cable system.

The cable television system may make use of a scrambler that maintains the chrome subcarrier on a sync-stripped output signal at all times including the period of vertical retrace. The sync-stripped output signal is modulated at a first carrier frequency and the sync-signal is modulated at a second carrier frequency. A corresponding decoder is provided for receiving scrambled signals and restoring the sync-signal to restore the television signal.

16 Claims, 26 Drawing Sheets

U.S. PATENT DOCUMENTS

| | | | |
|---|---|---|---|
| 4,633,462 | 12/1986 | Stifle et al. | 370/85 |
| 4,695,880 | 9/1987 | Johnson et al. | 358/86 |
| 4,706,121 | 11/1987 | Young | 358/142 |
| 4,709,418 | 11/1987 | Fox et al. | 455/612 |
| 4,710,971 | 12/1987 | Nozaki et al. | 455/179 |
| 4,748,689 | 5/1988 | Mohr | 455/612 |
| 4,760,442 | 7/1988 | O'Connell et al. | 358/86 |
| 4,769,833 | 9/1988 | Farleigh et al. | 379/105 |
| 4,769,838 | 9/1988 | Hasegawa | 380/7 |
| 4,801,190 | 1/1989 | Imoto | 350/96.16 |
| 4,821,102 | 4/1989 | Ichikawa et al. | 358/183 |
| 4,823,386 | 4/1989 | Dumbauld et al. | 380/13 |
| 4,827,253 | 5/1989 | Maltz | 340/734 |
| 4,829,372 | 5/1989 | McCalley et al. | 358/86 |
| 4,847,700 | 7/1989 | Freeman | 358/343 |
| 4,860,379 | 8/1989 | Schoeneberger et al. | 455/5 |
| 4,891,694 | 1/1990 | Way | 358/86 |
| 4,901,367 | 2/1990 | Nicholson | 455/5 |
| 4,903,126 | 2/1990 | Kassatly | 358/146 |
| 4,912,760 | 3/1990 | West, Jr. et al. | 380/7 |
| 4,918,516 | 4/1990 | Freeman | 358/86 |
| 4,922,532 | 5/1990 | Farmer et al. | 380/15 |
| 4,941,040 | 7/1990 | Pocock et al. | 358/86 |
| 4,947,244 | 8/1990 | Fenwick et al. | 358/86 |
| 4,963,995 | 10/1990 | Lang | 358/335 |
| 4,975,771 | 12/1990 | Kassatly | 358/146 |
| 4,994,909 | 2/1991 | Graves et al. | 358/86 |
| 4,995,078 | 2/1991 | Monslow et al. | 380/10 |
| 5,008,934 | 4/1991 | Endoh | 380/15 |
| 5,014,125 | 5/1991 | Pocock et al. | 358/86 |
| 5,027,400 | 6/1991 | Baji et al. | 380/20 |
| 5,057,917 | 10/1991 | Shalkauser et al. | 358/135 |
| 5,060,262 | 10/1991 | Bevins, Jr. et al. | 380/19 |
| 5,093,718 | 3/1992 | Hoarty et al. | 358/84 |
| 5,109,414 | 4/1992 | Harvey et al. | 380/10 X |
| 5,119,188 | 6/1992 | McCalley et al. | 358/86 |
| 5,130,792 | 7/1992 | Tindell et al. | 358/85 |
| 5,132,992 | 7/1992 | Yurt et al. | 375/122 |
| 5,133,079 | 7/1992 | Ballantyne et al. | 455/4.1 |
| 5,231,494 | 7/1993 | Wachob | 455/6.1 X |

OTHER PUBLICATIONS system design", *Communications Engineering and Design*, 1992.

Langenberg, Earl, "Integrating Entertainment and Voice on the Cable Network", pp. 187–194.

Large, David, "Tapped Fiber vs Fiber-Reinforced Cozxial CATV Systems: A Comparison of Evoluntionary Paths", pp. 1–21 1989.

*Insight*-brochure.

World Patent Application WO 90/13972.

UK Patent Application 2 248 955 A.

European Patent Application 0 449 633 A1.

Le Gall, Didier, "MPEG: A Video Compression Standard for Multimedia Applications", Communication of the ACM, vol. 34, No. 4, Apr., 1991, New York, N.Y.

Tamitani et al., "An Encoder/Decoder Chip Set for the MPEG Video Standard", 1992 IEEE International Conference on Acoustics, vol. 5, Mar., 1992, San Francisco, Calif.

| GRID TIME | DATE | SMART TV | | | |
|---|---|---|---|---|---|
| Evening | Tue, Mar 10 | | | | |
| | | 6:00 | 6:30 | 7:00 | 7 |
| 2 | FOX | Who's The Boss | Mama | Cheers | Co |
| 3 | IND | Wheel of Fortune | Business Report | A Current Affair | E |
| 4 | NBC | News | | Wheel of Fortune | Je |
| 5 | CBS | News | | A Current Affair | E |
| 7 | ABC | NFL Football: NY Giants at Pittsburgh | | | |
| 8 | IND | News | | Wheel of Fortune | Je |

FIG.21

INTERACTIVE HOME INFORMATION SYSTEM

This application is a continuation in part of U.S. application Ser. No. 07/754,932, filed Sep. 10, 1991, now U.S. Pat. No. 5,220,420 which is a continuation in part of U.S. application Ser. No. 07/589,205, filed Sep. 27, 1990, issued as U.S. Pat. No. 5,093,718. These related applications are hereby incorporated herein by reference.

TECHNICAL FIELD

The present invention relates to cable television systems, particularly those having two-way communications capability with the user.

BACKGROUND ART

Bandwidth problems have long restricted the ability of cable television systems to provide information services to subscribers. Although a coaxial cable system may permit a cable system operator to provide, for example, 50 television channels, each 6 MHz wide, with a total bandwidth of 300 MHz, this total bandwidth is insufficient to permit an arrangement wherein each subscriber may have, in addition to these 50 channels, an interactive information service that functions independently of interactive information services to all other subscribers and provides full color video, motion typical of movies or television, and sound.

The reason for the insufficiency in bandwidth is apparent on a consideration of the demands on the system. Typically a subscriber on a cable system obtains information services over a communication path that starts at the headend, proceeds over one of typically a number of trunks, and then over one of a number of feeders, and then over one of a number of taps. Each feeder may have, for example, fifty or more subscribers, and each trunk might serve a hundred or more feeders. The result is that 5000 subscribers per trunk is not atypical. Thus merely to provide a private one-way information service, and nothing else, to each of these 5000 subscribers would require the trunk to carry 5000 different signals, each using about 6 MHz of bandwidth, and would alone require a trunk bandwidth of 30 GHz, which is nearly two orders of magnitude greater than provided by a typical coaxial cable system. Even if it were assumed that at most only ten percent of these subscribers would want a private one-way information service at any given time, the required trunk bandwidth for this service alone would still be nearly an order of magnitude greater than provided by a typical system. While video compression schemes may bring the bandwidth requirements within more practical limits, each subscriber would then need to be provided with his own decompression unit.

Another problem lies in how to handle the switching and computing demands on the headend to provide separate and private information service to potentially hundreds of thousands of subscribers simultaneously.

SUMMARY OF INVENTION

In one embodiment the invention provides a system for an interactive cable television environment. This system has a feeder server in communication with a cable headend to provide one of a plurality of information services depending on a selection input. Each of these information services has at least an information output. Associated with the feeder server is a modulator to provide the information output of a selected service at a selected carrier frequency. A home interface controller is in communication with a user's television and has (i) a radio frequency input that is tunable to the selected carrier frequency of the modulator, in (ii) an arrangement for channel selection, and (iii) a data communications link with the feeder server for communicating to it the channel selected. The home interface and the feeder server are so arranged that when any of a preselected group of channel is selected, the modulator provides the information output at a selected carrier frequency that does not change for any channel in the group and the selection of a different channel causes the feeder server to provide a different information service at the selected frequency. In a further embodiment, this system includes an arrangement for generating a barker signal at a fixed carrier frequency for prompting a user to access the preselected group of channels. In a further embodiment, the feeder server includes an arrangement for assigning a carrier frequency over which the modulator provides information service output to the home interface controller when a channel in the group is selected. In a further embodiment, the feeder server and the modulator are disposed in a node located proximately to the feeder of a cable television system. In another embodiment, the invention provides a user interface for an interactive television system. The interface includes an arrangement for generating a television display of a carousel having a plurality of faces, one of which is a frontal face. An arrangement is also provided for indicating in the display at least one available choice on the frontal face. A cursor can be moved over the television display and a selection can be made of an available choice when indicated by the cursor in the display. Also there is an arrangement for causing apparent rotation of the carousel to display different information on the frontal face in response to the making of a selection. In a further embodiment, a plurality of available choices are shown on the frontal face and the carousel can be caused to rotate in either of two directions depending upon the selection of an available choice.

In another embodiment, the invention provides a node for use in an interactive cable television environment. The node has a headend port for communication with a cable headend and a feeder port for communication with a plurality of home interface controllers. Each home interface controller has a radio frequency input and a data communications link with the feeder port. The node also has a plurality of feeder servers. Each feeder server is in communication with the headend port and the feeder port and provides one of a plurality of information services depending on a selection input. Each information service has at least an information output, and the feeder server includes a modulator to provide the information output of a selected service at a selected carrier frequency to the feeder port. Finally, the node includes a control arrangement in communication with the feeder port to determine whether the a home interface controller is active (based on information received over the data communications link). In the event the home interface controller is determined to be active the control arrangement assigns a feeder server to it during the time the interface controller is determined to be active. In a further embodiment, each feeder server also includes an arrangement for demodulating and decompressing a compressed video information radio frequency signal received at the headend port. In a further embodiment, each home interface controller has associated with it a remote unit having controls for moving a cursor displayed on a television connected to the controller and for making a selection. In this embodiment, each feeder server also includes an arrangement (based on information received over the data communications link) to provide a video information signal that causes a display on the television connected to the applicable home interface controller to permit the viewer to move the cursor and make a selection and to communicate data to and from the headend to permit the viewer to obtain interactive television service.

In a further embodiment of the node described above, the information output includes a television signal source and the feeder server also includes an arrangement for removing the sync signal from the source to provide a sync-stripped output signal while maintaining the chroma subcarrier on this sync-stripped output signal at all times including the periods of horizontal and vertical retrace so as to provide a scrambled signal. This scrambled signal is modulated and supplied at a first carrier frequency to the feeder port. A second modulator supplies the sync-stripped signal at a second carrier frequency to the feeder port. In a further embodiment, the second carrier frequency is approximately 50 MHz.

In another embodiment, the invention provides a system for providing a scrambled signal over a cable television system from a television signal source. The system includes an arrangement for removing the sync signal from the source to provide a sync-stripped output signal and an arrangement for maintaining the chroma subcarrier on the sync-stripped signal at all times including the period of vertical retrace. A first modulator supplies the resultant scrambled signal at a first carrier frequency over the cable system, and a second modulator supplies the sync-stripped signal at a second carrier frequency over the cable system. In a further embodiment, the second carrier frequency is approximately 50 MHz.

In another embodiment of the invention, there is provided a system for decoding a composite scrambled television signal that includes a first carrier, at a first frequency, modulated with a sync-stripped video signal with a continuously present chroma subcarrier and a second carrier, at a second frequency, modulated with the sync-stripped signal. The system includes a first demodulator for the sync-stripped signal at the first frequency and a second demodulator for the sync-stripped signal at the second frequency, as well as an arrangement for combining the outputs of the two demodulators in such a way as to restore the television signal.

In another embodiment, the invention provides a cable television system permitting interactive television service. The system includes a cable system having an upper frequency limit for carrying analogue television signals with acceptable quality from the headend up to the taps. An arrangement is used to provide at least one digitally compressed video signal at the headend, and a modulator at the headend supplied the digitally compressed video signal over the cable system at a carrier frequency greater than the upper frequency limit. In a further embodiment, there is provided a plurality of digitally compressed video signals, which are multiplex, and then supplied via a modulator at a carrier frequency greater than the upper frequency limit. In a further embodiment, the system also has at least one node located at a feeder, and the node has headend and feeder ports for communicating with the headend and a plurality of home interface controllers. Each home interface controller has a radio frequency input and a data communications link with the feeder port. The node also includes a plurality of feeder servers in communication with these ports. Each feeder server provides one of a plurality of information services depending upon a selection input, with each information service having at least an information output. Each feeder server includes a modulator to provide the information output of a selected service at a selected carrier frequency to the feeder port, and an arrangement for demodulating, demultiplexing and decompressing the multiplex video signals received at the headend port. In a further embodiment, each feeder server includes a controller arrangement for determining whether a home interface controller is active based on information received over the data communications link, and in the event the home interface controller is determined to be active, for assigning a feeder server to it during the time such interface controller is determined to be active.

In a related embodiment, the invention provides a cable television system permitting interactive television service. This system includes a cable system, a source of a plurality of digitally compressed video signals, an arrangement for multiplexing these compressed video signals, as well as an arrangement for supplying the multiplexed video frequencies on a radio frequency carrier, and finally an arrangement for demodulating, demultiplexing and decompressing the multiplexed video signals. In a further embodiment, the demodulating, demultiplexing and decompressing are accomplished at a node located proximately to a feeder. In a further embodiment, the node also includes a plurality of feeder servers to achieve the demodulating, demultiplexing and decompressing of the multiplexed video signals. Each feeder server is assigned by a controlled arrangement to a home interface controller that is determined to be active in the manner described above.

BRIEF DESCRIPTION OF THE DRAWINGS

The foregoing aspects of the invention may be more readily understood by reference to the following description taken with the accompanying drawings, in which

FIGS. 20–26 illustrate use of the carousel menu system and of the manner in which the invention in a preferred embodiment provides interaction with the user.

DETAILED DESCRIPTION OF SPECIFIC EMBODIMENTS

For the purposes of the description herein and the claims that follow it, unless the context otherwise requires, the terms "cable television environment" and "cable television system" include all integrated systems for delivery of any information service to subscribers for use in connection with their televisions. These include conventional cable television systems utilizing coaxial cable for distribution primarily of broadcast and paid television programming, as well as cable television systems using fiber optics and other means for distribution of information services to subscribers. Similarly, unless the context otherwise requires, the term "information service" includes any service capable of being furnished to a television viewer having an interface permitting (but not necessarily requiring) interaction with a facility of the cable provider, including but not limited to an interactive information service, video on demand, local origination service, community event service, regular broadcast service, etc. "Interactive television service" means an information service that utilizes an interface affording two-way communication with a facility of the cable provider.

Figure 1:
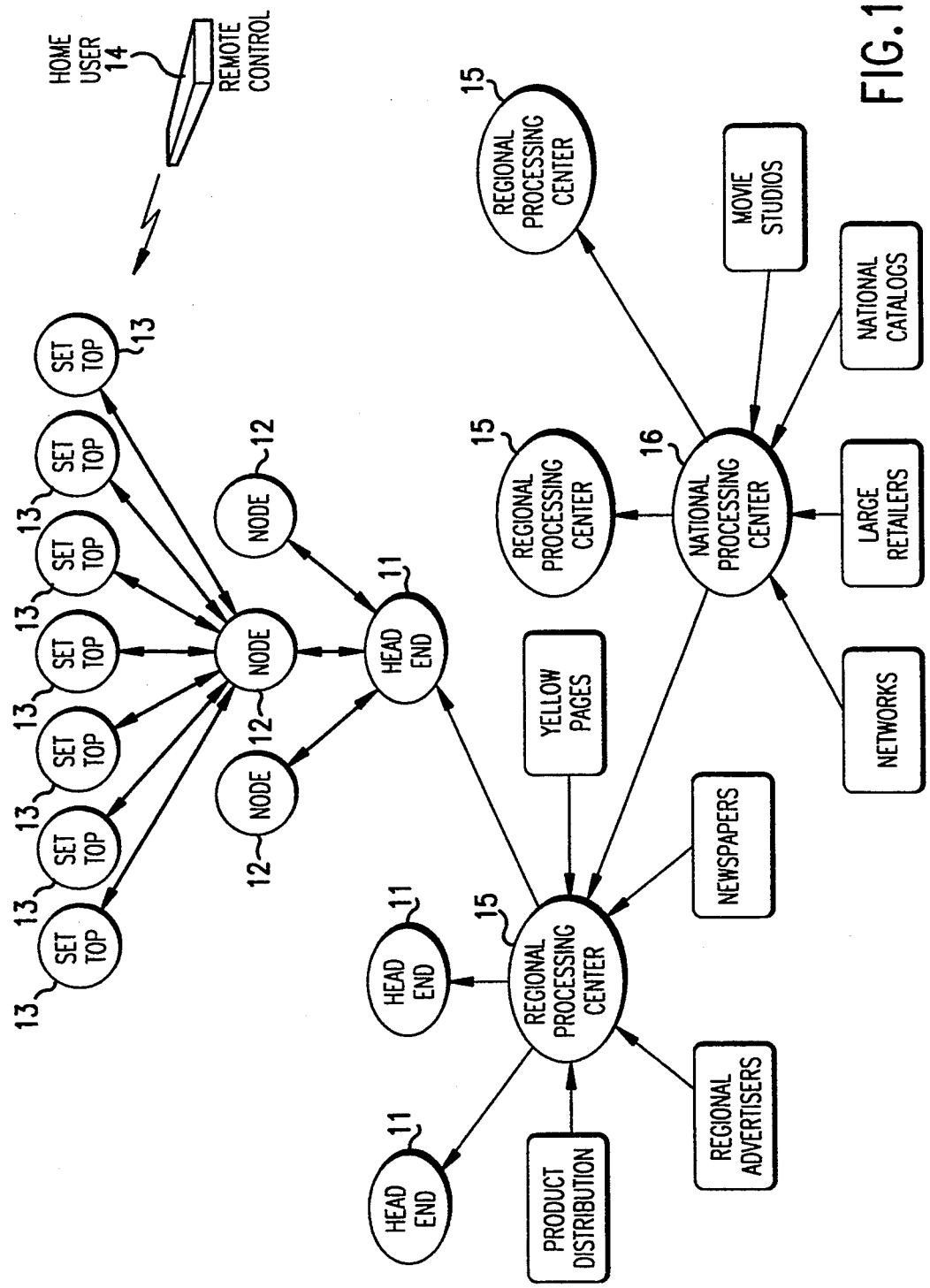
FIG. 1 is a schematic of the relation of a cable television system in accordance with the present invention in relation to national and regional processing center.

In FIG. 1 there is shown the relationship of a cable television system in accordance with the present invention to regional and national processing systems. A headend 11 is in communication with a plurality of nodes 12 that in turn communicate with set top units 13, which below are referred to as "home interface controllers". Each of these home interface controllers has a remote control 14 operable by the user. Each headend 11 may obtain items for use in providing an information service from a regional processing center 15, which in turn may obtain some items from a national processing center. The information services may include a wide range of offerings, such as classified services, newspapers, advertising, catalogue ordering, video on demand or near video on demand, etc.

Figure 2:
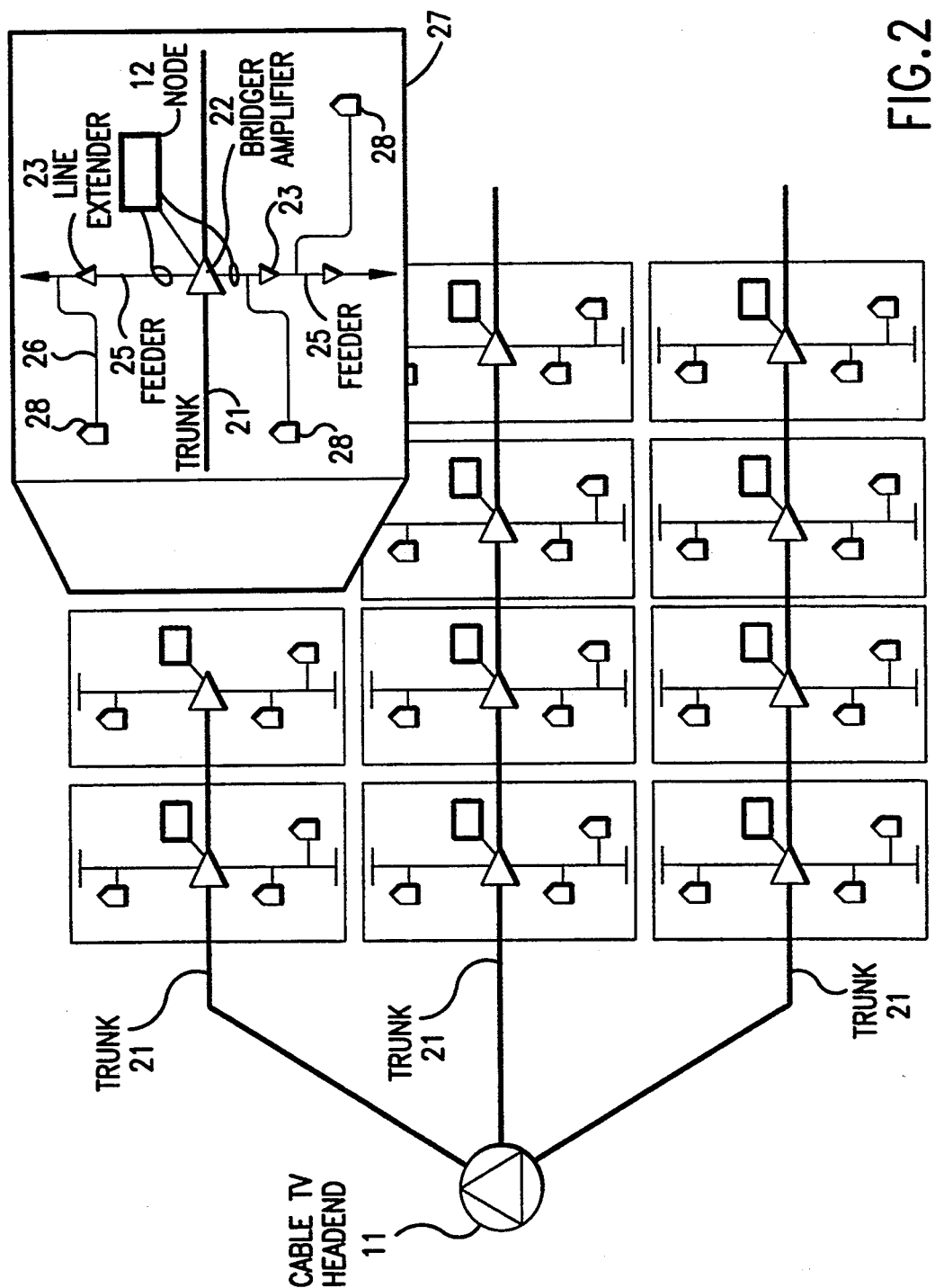
FIG. 2 is a cable television system in accordance with a preferred embodiment of the invention.

In FIG. 2 there is shown the configuration of a cable television system in accordance with a preferred embodiment of the invention, in which a headend 11 serves subscribers in homes 28. The distribution of information services is over trunks 21 having bridge amplifiers 25, and then over feeders 25 in which there may be present line extender amplifiers 23. A node 12 serves a plurality of subscriber homes 28 and provides the basis for interactive television services between the subscriber and the headend. Each group of subscribers associated with a node can be thought of as a single cell 27 that communicates with the headend 11. The same portion of spectrum in the cable system used by a single cell 27 can be used by another cell, since each node 12 communicates independently with its own group of subscribers. This approach, along with other aspects of the invention discussed in this description, significantly overcomes bandwidth and other restrictions on providing interactive television service over cable television systems.

Figure 3:
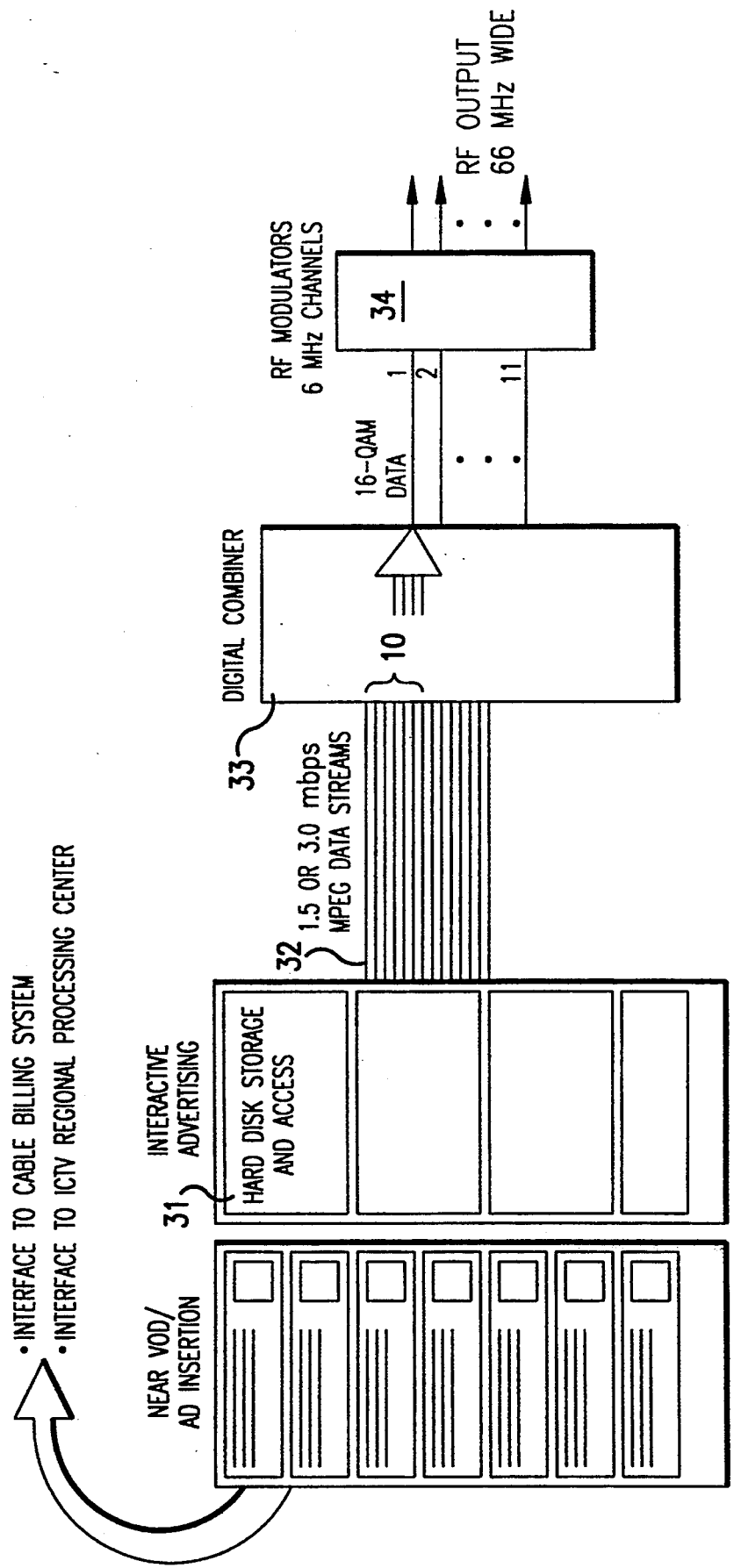
FIG. 3 is a schematic of a headend providing interactive television in accordance with a preferred embodiment of the invention.

FIG. 3 shows a headend providing interactivity in accordance with a preferred embodiment of the invention. The headend includes a hard disk storage and access system 31 containing digitally compressed video signals which, may, for example be movies. A variety of systems are available for digital compression of video signals, including the standard promoted as MPEG, and well known in the art. Additional material such as classified advertisements, catalogues, and other information may similarly be compressed and stored in the system 31. In accordance with subscriber requests in an interactive session (for providing video on demand, for example) or a fixed schedule (for providing, for example, near video on demand), the digital data stream 32 from this system is multiplexed, typically in groups of 10 information sources at a time by the combiner 33 and each multiplexed signal emerging from the combiner 33 is then modulated at a different frequency, with the carrier frequencies spaced (for example) 6 MHz apart, by the bank of modulators 34 to provide an output from the headend. Although broader bandwidth channels than 6 MHz can be used, the advantage of this bandwidth is the ready availability of conventional electronic hardware to achieve the modulation. With 90 movie sources, 10 interactive channels and 10 data channels, there would be 11 multiplexed signals emerging from combiner 33, and therefore a bandwidth of approximately 66 MHz for the output of the modulators 34.

Figure 4:
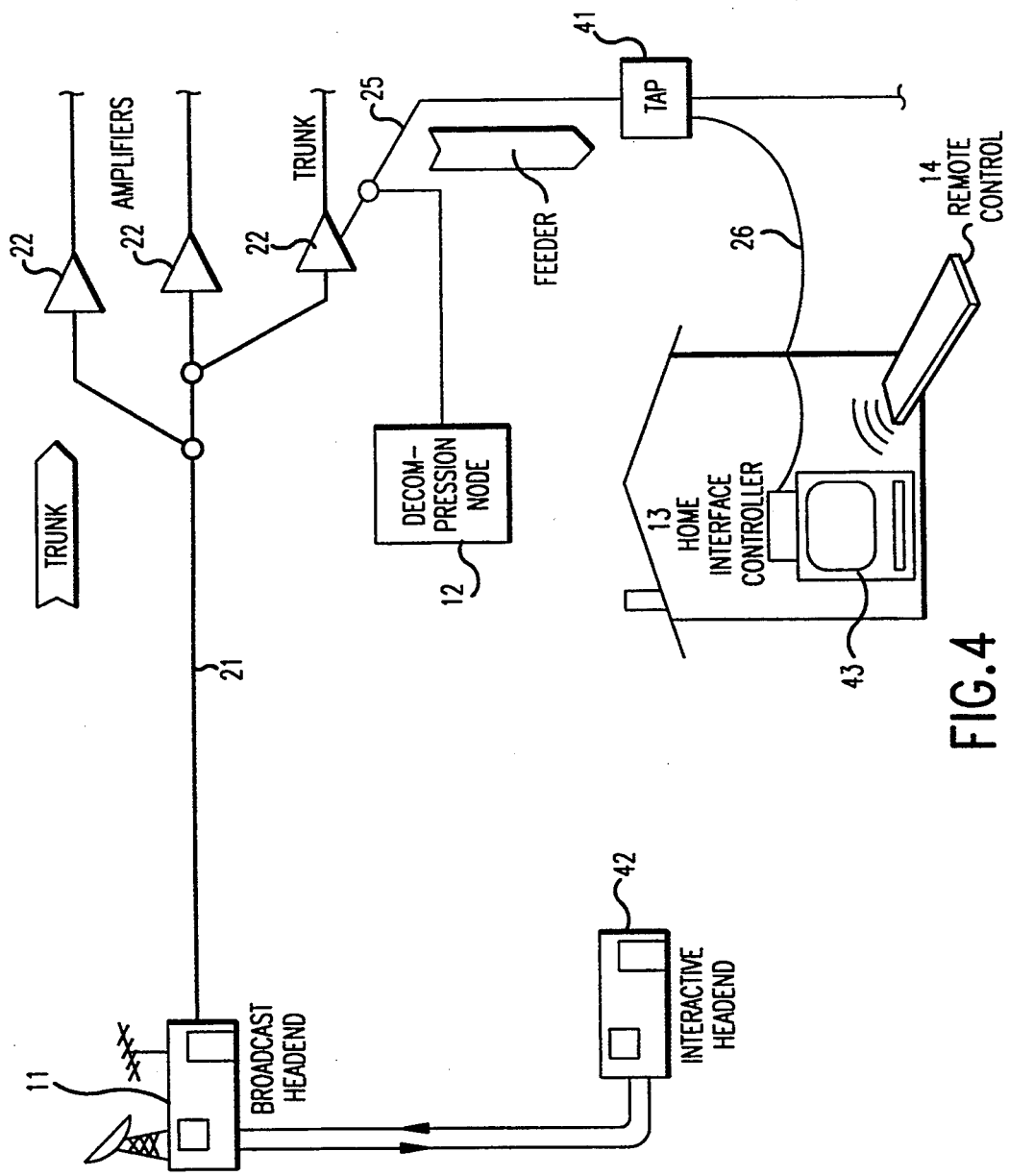
FIG. 4 is a diagram of an embodiment of the invention utilizing conventional coaxial cable.
Figure 5:
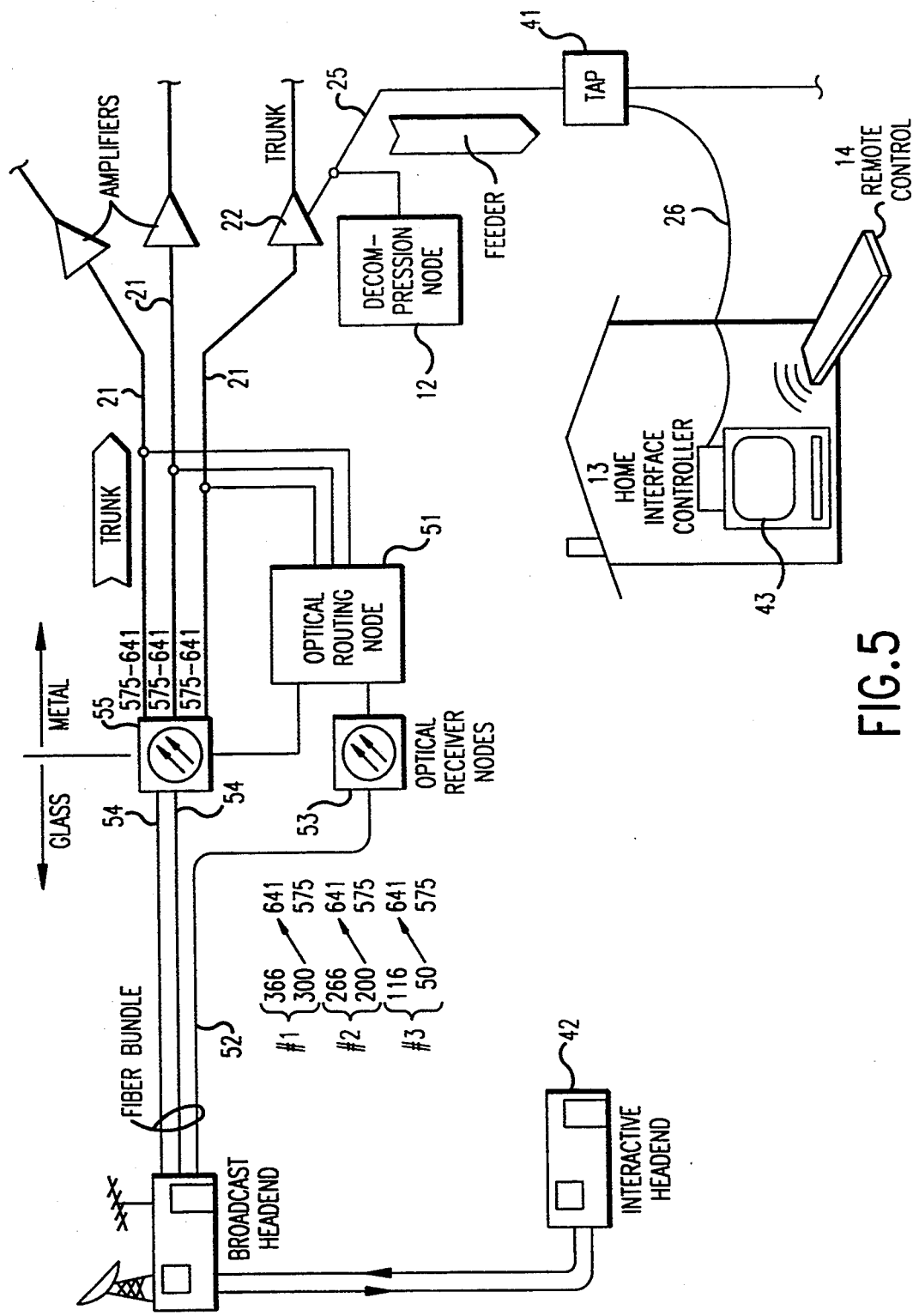
FIG. 5 is a schematic of an embodiment of the invention utilizing fiber optics for a portion of the distribution system.

FIGS. 4 and 5 show architectures for a coaxial cable system and a hybrid fiber optic/coaxial cable system respectively. An interactive headend 42 may be located, if desired, in a separate location from the standard broadcast headend 11. The interactive headend communicates with decompression nodes 12 located on feeders 25. These nodes achieve decompression, but also interact with both the interactive headend and the subscriber's home interface controller 13, which receives control information from remote control 14. Each home interface controller 13 is connected via a standard drop 26 to a standard tap 41 on feeder 25. In the case of a fiber system in FIG. 15, a separate fiber 52 from the headend serves the interactive portion of the system, and its optical receiver node 53 together with the optical receiver 55 of the other fibers 54 are in communication with an optical routing node 51 to provide communication over the coaxial cable trunk 21.

Figure 6:
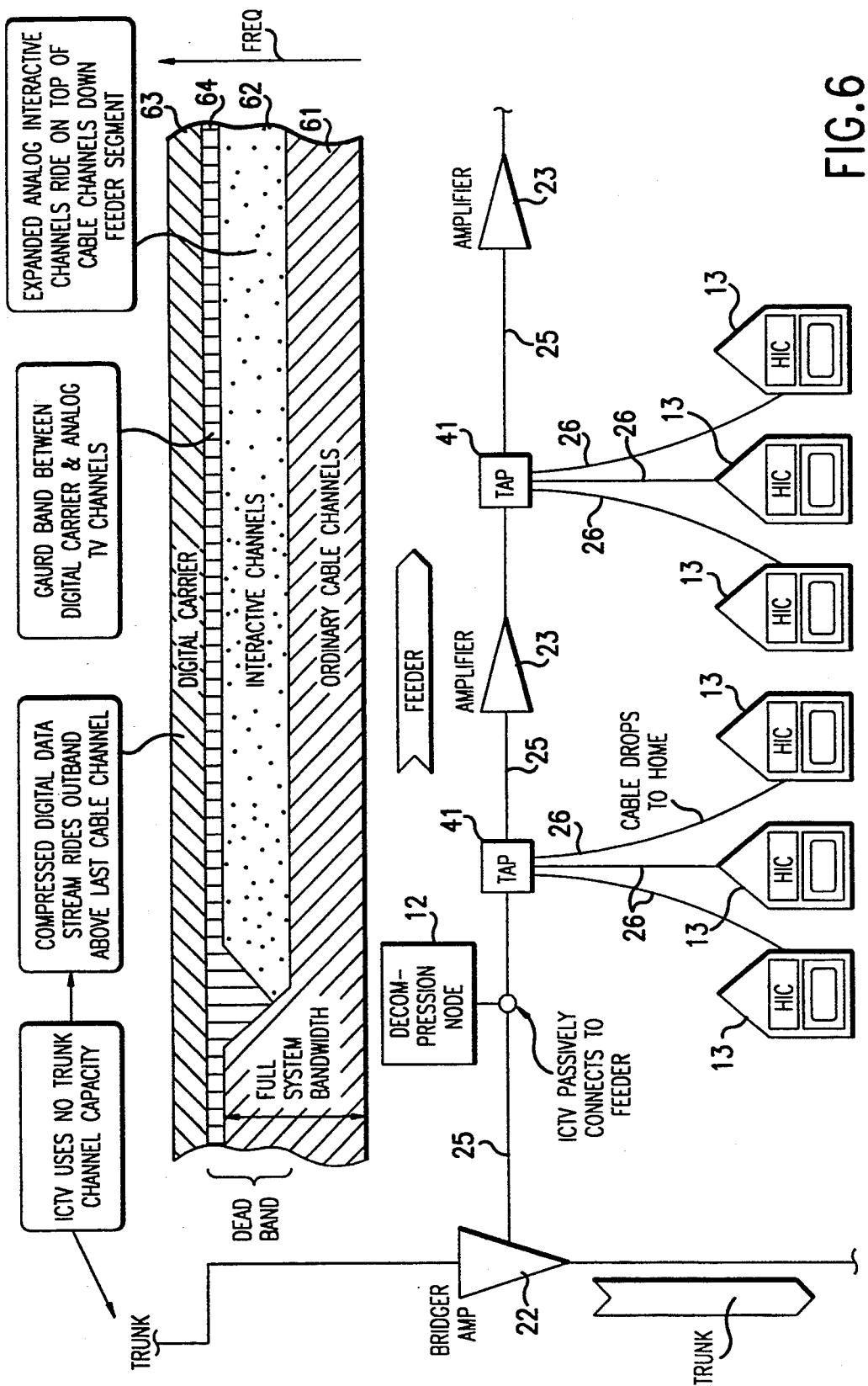
FIG. 6 is a schematic showing bandwidth usage in the cable system in accordance with a preferred embodiment of the invention.

In FIG. 6, there is shown bandwidth usage in a cable television system according to FIG. 4. The system bandwidth is greater at the trunk than at the feeder, where it decreases. Thus the node 12 is able to utilize, uniquely for communication to the home interface control 13 associated with its own group of feeders, the interactive channel bandwidth 62 shown in FIG. 6.

Each node may utilize this bandwidth region independently of the other nodes, because signal transfer in the frequency spectrum portion 62 is small, and in any event can be controlled between different nodes. Outside the regular bandwidth of the system (for delivery of analog television signals of acceptable quality) is placed the spectrum portion 63 used for carrying multiplexed digital signals from the headend. A guardband 64 is placed between band 63 and band 62 to prevent interference. Each node 12 then achieves demodulation and decompression of those digital signals pertinent to the subscribers associated with such node who have obtained access to such signals.

Figure 7:
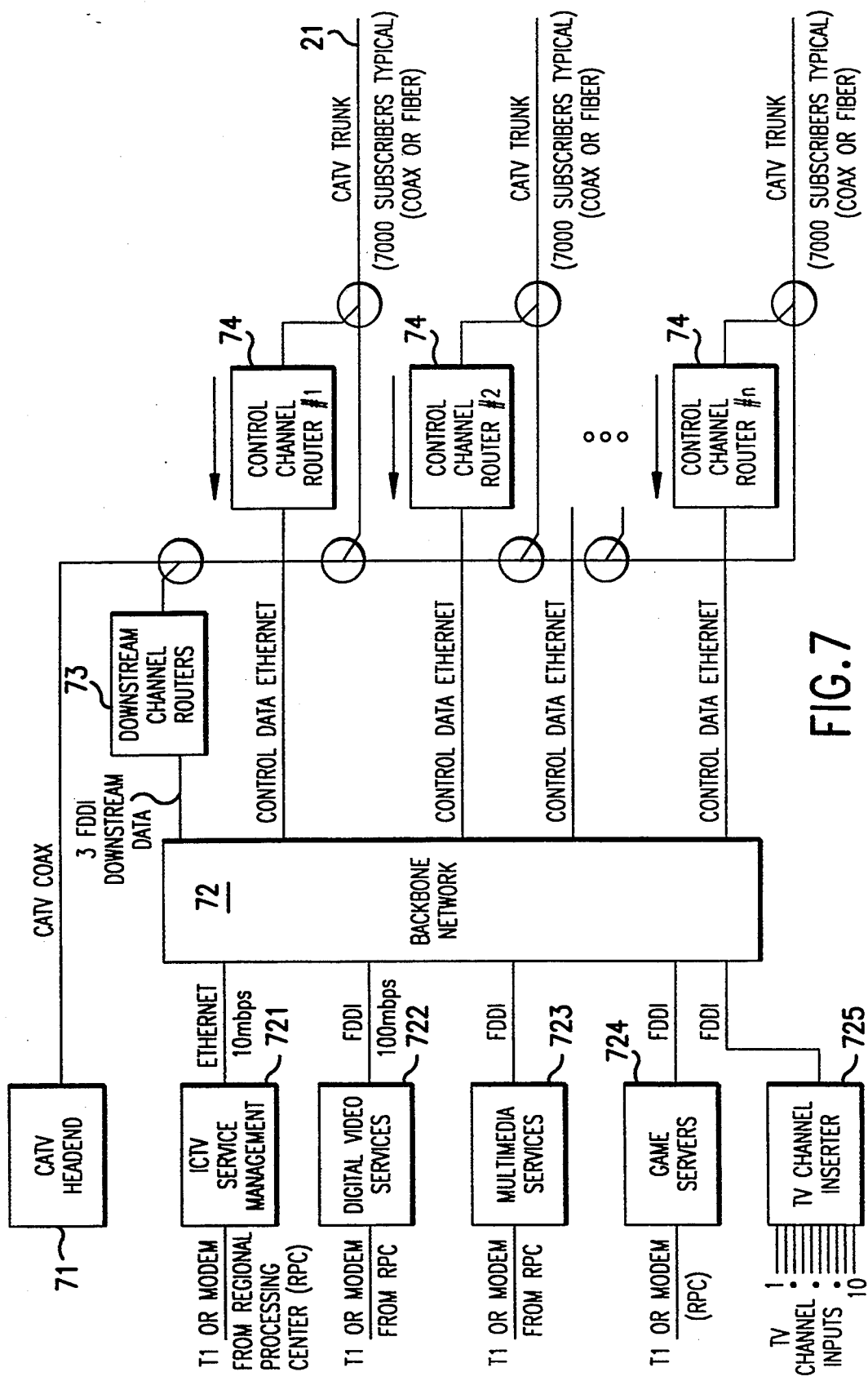
FIG. 7 is a more detailed view of a portion of the headend of FIG. 3.

FIG. 7 provides further detail of the headend arrangement shown in FIG. 3. A plurality of servers are associated with backbone network 72, including an interactive service management server 721, a bank of digital video servers 722, multimedia server 723 for interactive advertising, game servers 724, and TV channel Inserter 725.

The TV channel inserter 725 takes inputs from (here) ten ordinary TV channels and provides them to subscribers as part of the system that digitally compresses and multiplexes information services. These TV channels are preferably ones that are watched by relatively few subscribers, so that they can effectively be provided to subscribers on a contention basis, with the result that bandwidth in the feeders is conserved. In an alternative embodiment to that shown in FIG. 6, the digitally compressed and multiplexed signals may be sent on the trunk within the normal analog bandwidth. In such a case the bandwidth for the digital signals may be obtained by displacing ten analog signals that have relatively few watchers. The ten displaced signals can then be resupplied on a contention basis using TV channel inserter 725 as previously described. A series of downstream channel routers 73 (including the combiner 33 and modulators 34 shown in FIG. 3) achieve outbound distribution of the information services, whereas a series of control channel routers 74 provide two-way communication with the nodes to permit the subscriber to obtain the interactive television service.

Figure 8:
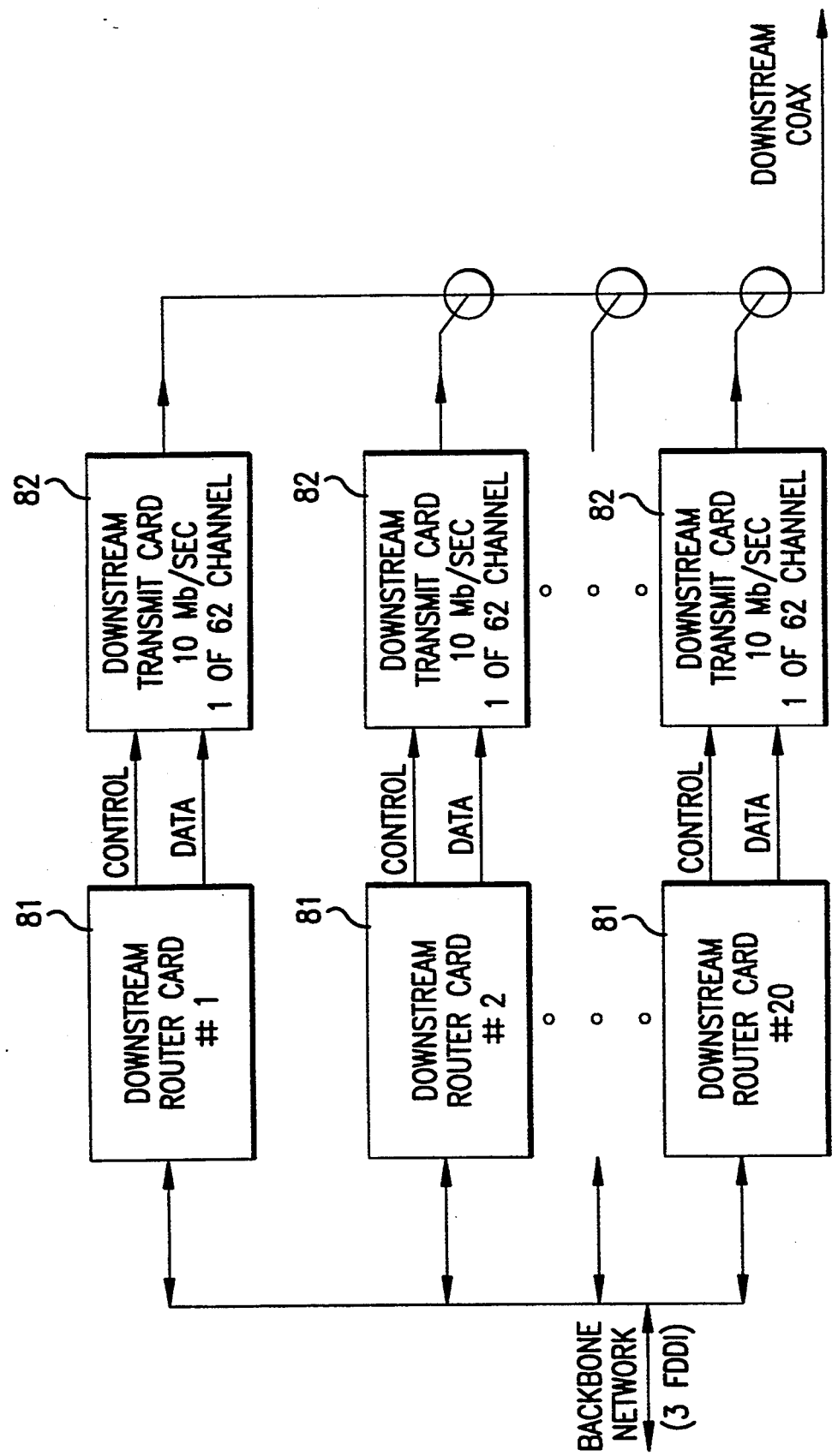
FIG. 8 is a schematic showing detail of the downstream channel router 73 of FIG. 7.

In FIG. 8 there is shown detail of the downstream channel router 73, which include a plurality of downstream router cards 81 and transmitter cards 82.

Figure 9:
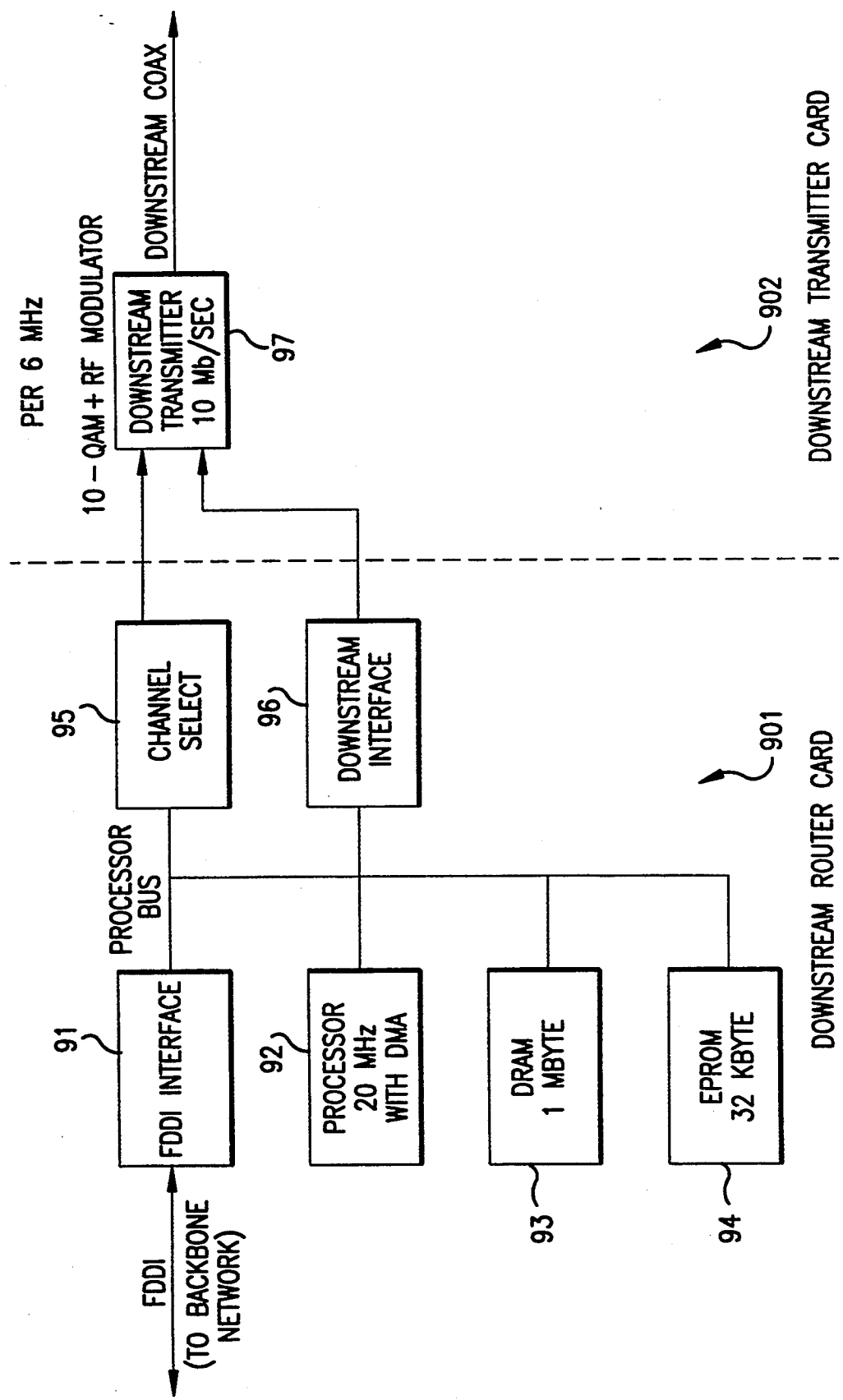
FIG. 9 shows detail of the downstream router and downstream transmitter cards of FIG. 8.

FIG. 9 shows further detail of the downstream router card 901 and transmitter card pair 902. Each card includes a central processor 92 having direct memory access (DMA), dynamic RAM 93, EPROM 94, and downstream interface 96 in communication with one another over processor bus 99. The EPROM 94 provides a bootstrap set of instructions to cause the processor to load a program into dynamic RAM 92 from the management server 721. Under the loaded program, the processor controls outbound distribution of information services to the subscribers via the node. The information services are accessed over the FDDI interface 91 to the backbone network 72, and, via the downstream interface 96, are distributed by downstream transmitter 97 over the trunk. As discussed above in connection with FIG. 3, downstream router card 901 and downstream transmitter card 902 pair here handle ten digitally compressed information services that are multiplexed for transmission over the trunk. The channel select control 95 causes selection of the carrier frequency of the information services transmitted by the card 902.

Figure 10:
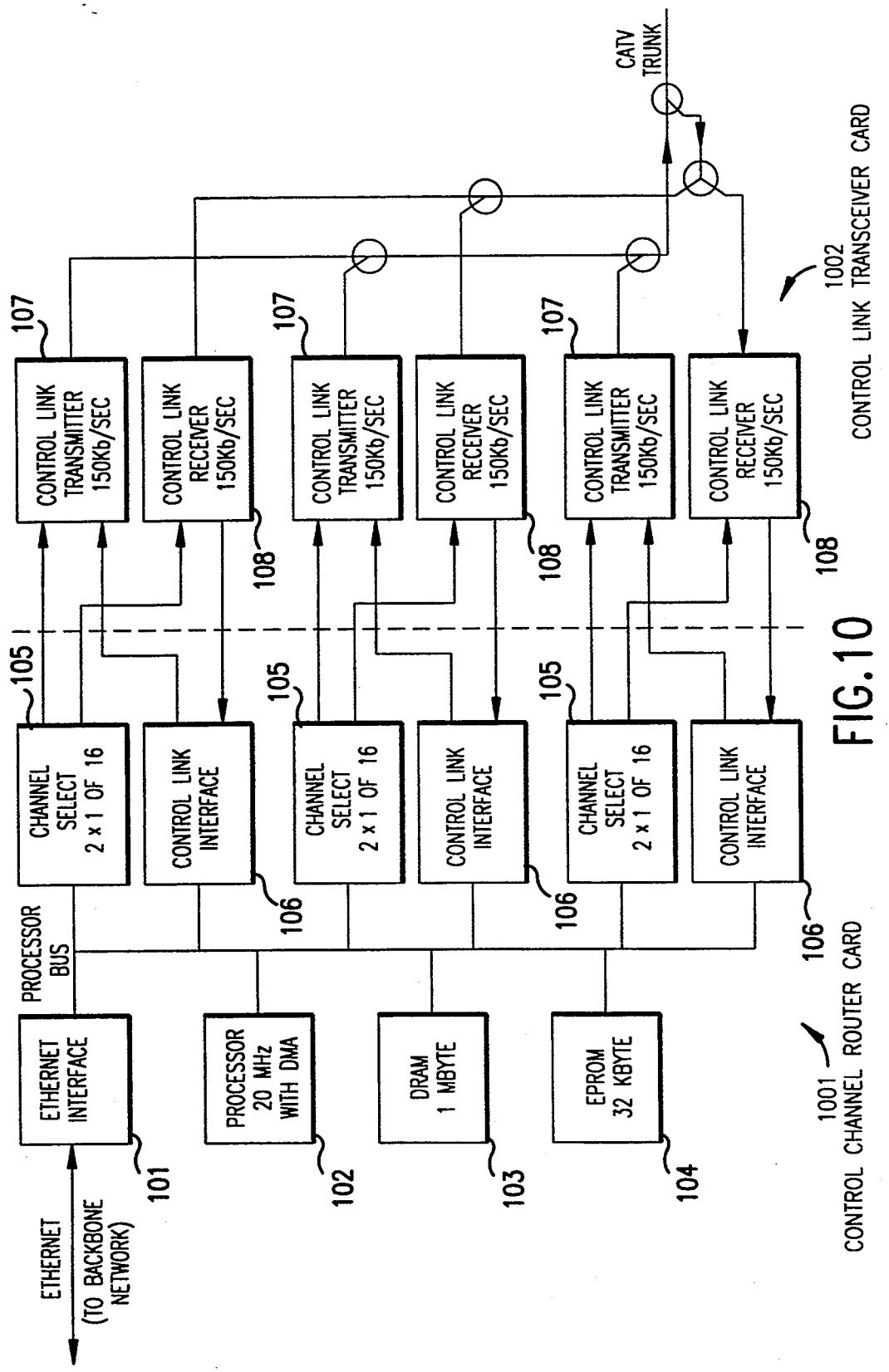
FIG. 10 shows detail of the control channel routers 74 of FIG. 7.

FIG. 10 shows detail of the control channel routers 74 of FIG. 7. The control channel routers 74 of FIG. 7 cause to be performed authorization and billing service for subscribers seeking to view a movie or other information service provided to all nodes. In general in the case of interactive television, the node with which the subscriber is communicating makes data requests via the channel routers 74 to signal, over the backbone network 72 of FIG. 7, to the appropriate server. Each control channel router 74 of FIG. 7 may contain one or more pairs of cards diagrammed in FIG. 10. Each control channel router 74 handles two-way communication over a given trunk with the nodes downstream of the given trunk. FIG. 10 shows the control channel router card 1001 and the control link transceiver card 1002; additional pairs of these cards can be added to increase capacity, as needed, of any control channel router 74 of FIG. 7. Referring to FIG. 10, data communications between the control channel router card and the backbone network are via either net interface 101. Processor 102 operates in association with dynamic RAM 103 and EPROM 104. The EPROM provides a bootstrap set of instructions to cause the processor to load a program from the management server 721. Under the loaded program, the processor controls two-way data communication flow between the node and the backbone. Each channel router card communicates with the nodes downstream of the given trunk over three different links. For each link, there is provided a transmitter 107 and a receiver 108. Each link transmitter and each link receiver can operate at one of 16 different frequencies in accordance with the selection made by channel selector 105; the transmitter frequency need not match the receiver frequency. Each channel serves a group of nodes. Each node is given a unique address. Control link 106 permits interface with data packets coming from and going to a node. Initially, all links operate at the same frequency. As data traffic increases, the program causes the control links to operate at different frequencies. However, regardless of the frequency of any link, outbound data packets are received by the appropriate node based on the unique address provided in the data packet.

Figure 11:
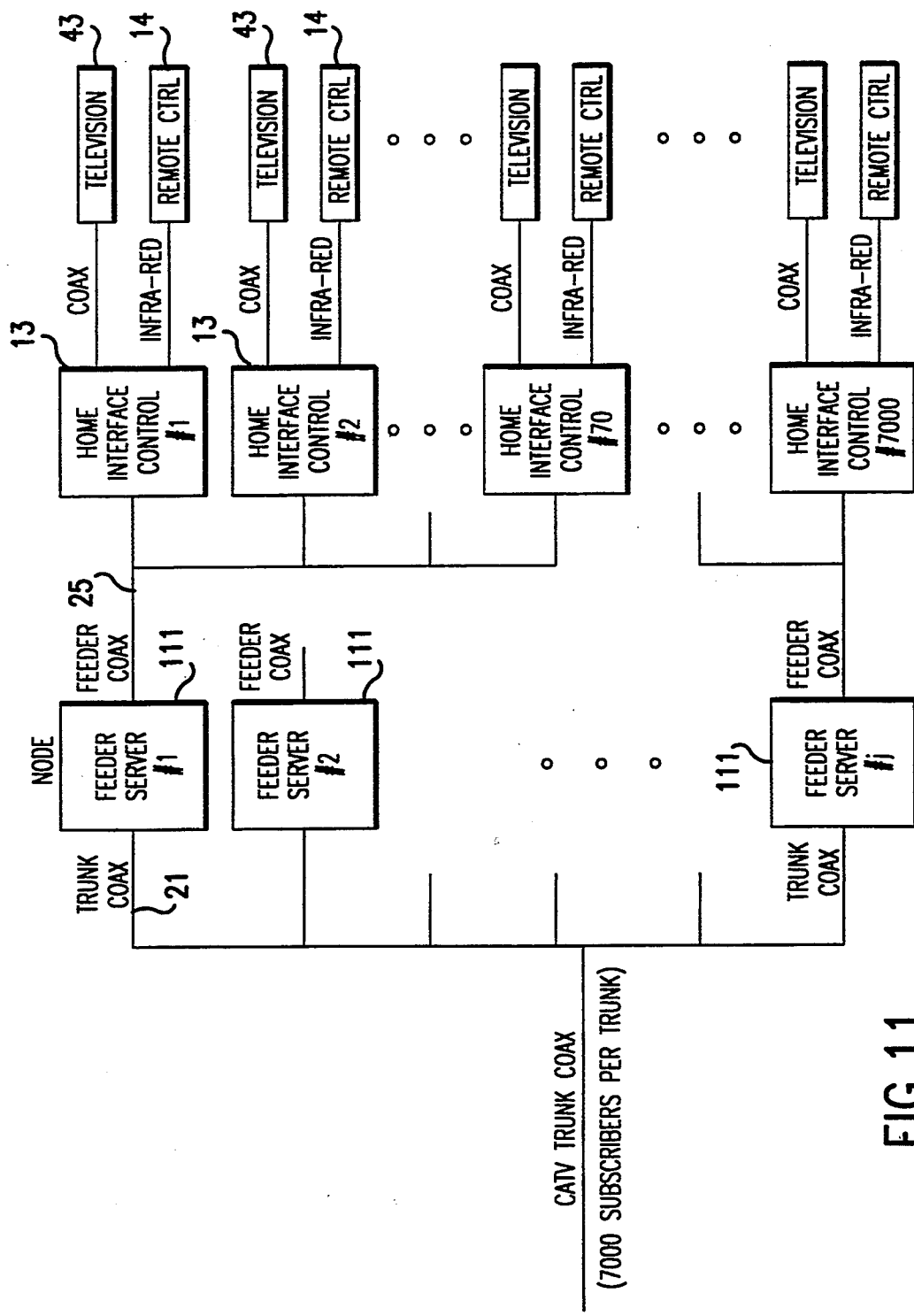
FIG. 11 is a schematic of a node in accordance with a preferred embodiment of the invention.

FIG. 11 shows detail of the interaction between basic node architecture and the user. A plurality of feeder servers 111 serve a plurality of home interface control units 13. It is contemplated, in the manner discussed in the parent applications, that there may be more home interface controls than there are feeder servers 111 in a node serving a group of subscribers. Typically not all subscribers would be expected to seek to use interactive television simultaneously, so the feeder servers can be assigned on a contention basis. In the event that the level of contention becomes undesirably great, additional feeder servers can be added. As previously described, each home interface control 13 has associated with it a television 43 and remote control unit 14.

Figure 12:
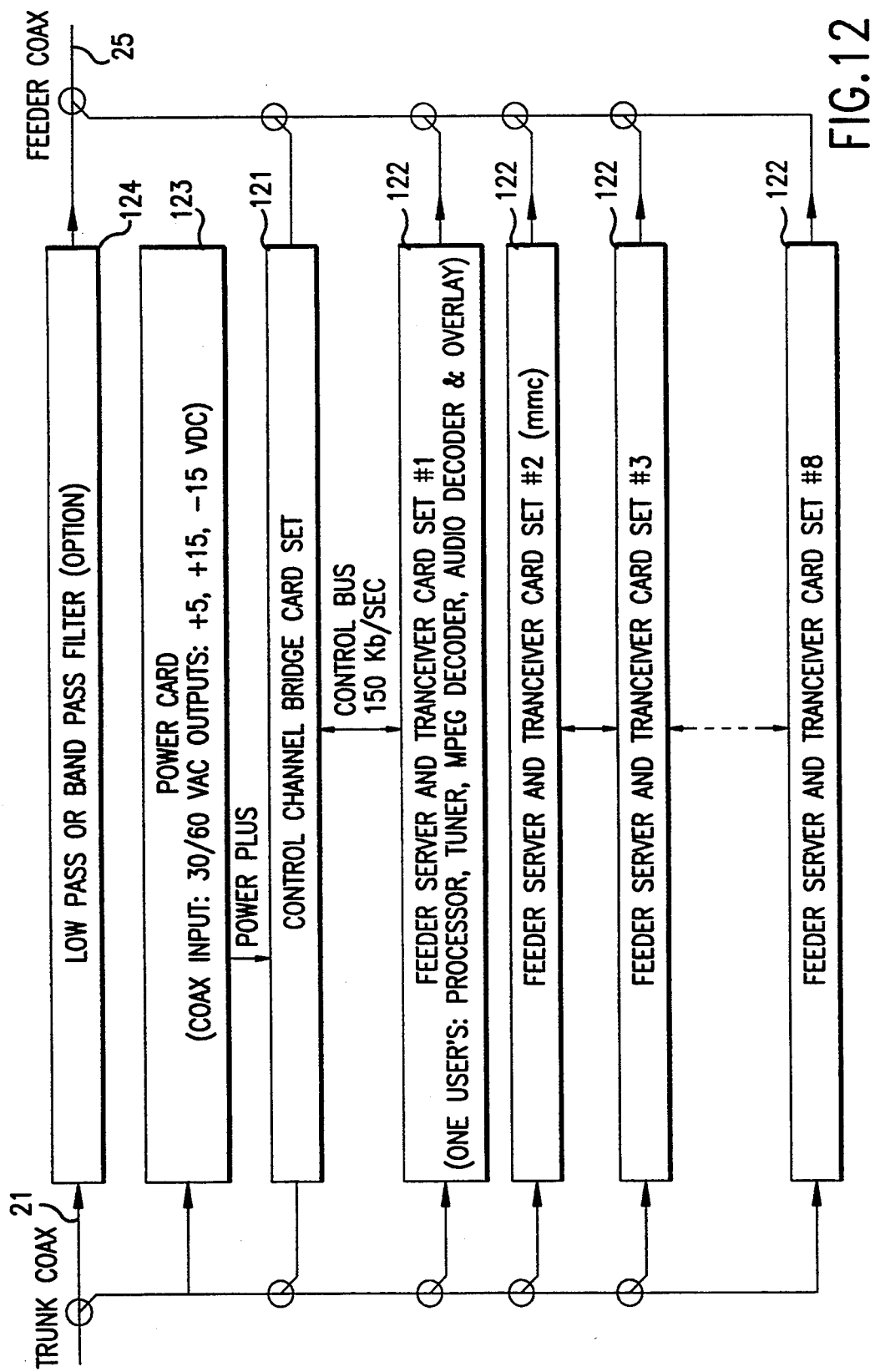
FIG. 12 is detail of a single feeder server 111 of FIG. 11.

The architecture of a typical node is shown in FIG. 12. The node includes a plurality of feeder server cards 122, which are in communication with both the trunk 21 and feeder 25. If, owing to undesirably large levels of contention, additional feeder servers are needed, they can be supplied by adding additional feeder server cards 122. Although this FIG. 4 and FIGS. 11, 13, and 14 show a direct connection to the trunk for purposes of illustration, in fact the actual connection is made to the feeder just ahead of the other feeder connection shown in the figures. In addition a similarly ported control channel bridge card set 121 allocates home interface controllers to feeder servers 122. A power card 123 is present to provide power to the node circuitry, and a low pass or band pass filter 121 may also be present to prevent communications between the node and its particular group of home interface controllers from leaking out to other nodes or to the headend.

Figure 13:
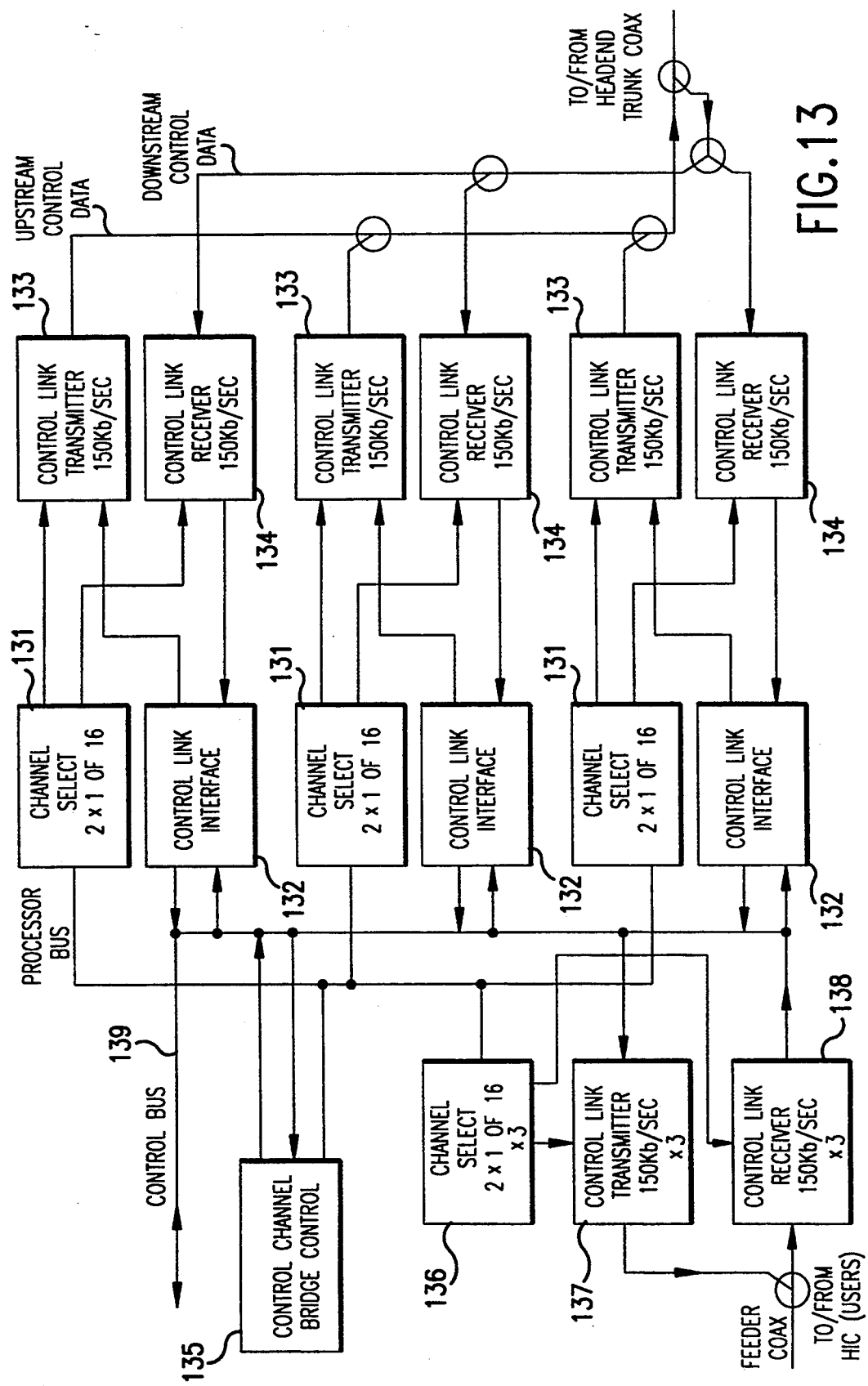
FIG. 13 is detail of the control channel bridge card of 121 of FIG. 12.

The control channel bridge card set of FIG. 13 functions in a manner analogous to the control channel router card and control link transceiver card of FIG. 10. A set of three control link transmitter and receiver units 133 and 134 respectively handle data communication between the node and the control channel router 74 of FIG. 7 (and in particular to a corresponding transmitter 107 and receiver 108 on the control line transmitter control of FIG. 10). The frequencies of the receiver 134 and transmitter 133 are determined by the channel select function 131, and the data interface is achieved by command line data interface 132. Similarly, a set of three control link transmitters 137 and control link receivers 138 handle data communications with the home interface controller 13. The frequencies of the transmitter 137 receiver 138 are controlled by channel selector 136. Although there is no contention for frequencies for the control links with the home interface controllers, it is useful to retain frequency agility here to avoid interference.

Figure 14:
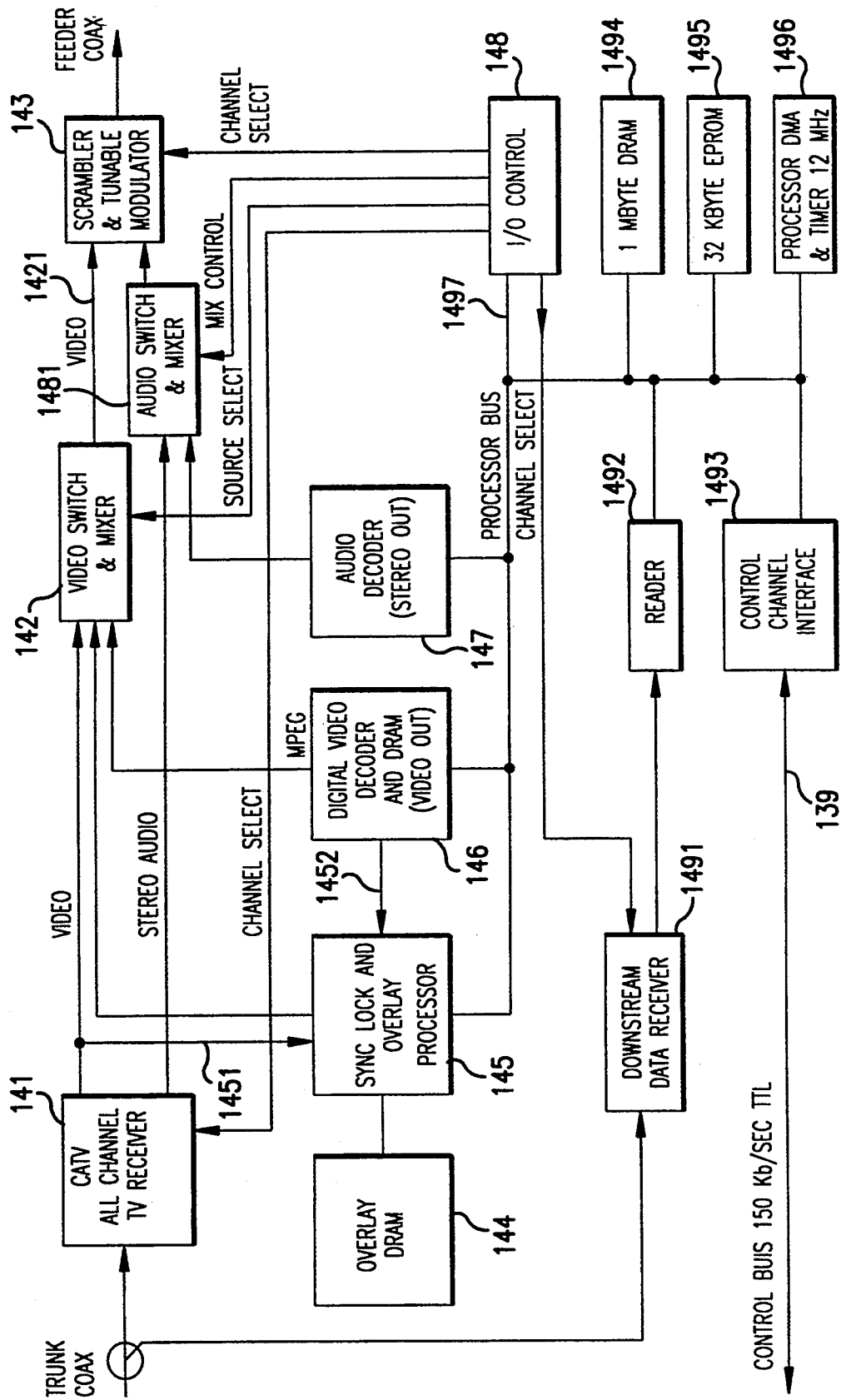
FIG. 14 is detail of the feeder server card 122 of FIG. 12.

FIG. 14 provides detail of the feeder server card 122 of FIG. 12. The multiplexed digitally compressed video carrier signal over the trunk is received and demodulated by receiver 1491 and then the multiplexed digital data stream at baseband emerging from the receiver 1431 is processed by reader 1492, which pulls from the data stream the data pertinent to the information service selected by the subscriber whose home interface controller is currently being served by the feeder server. The output from reader 1492 is put in the processor bus 1497. The output is buffered in dynamic RAM 1494 and moved where appropriate by processor 1496. Audio data is routed to audio decoder 147. Video data is routed to digital video decoder 146. Overlay data (to be placed over another video signal found by receiver 141) is routed to overlay processor 145. Processor program instruction data is moved to dynamic RAM 1494. EPROM 1495 is used as a bootstrap to cause the processor 1496 to load its control program from the headend, and the control program is modified as necessary in the course of interactive television service to the subscriber. The overlay processor 145 works in conjunction with overlay dynamic RAM 144 and provides an output to video switch and mixer 142. In order to assure common sync with the video signal emerging from receiver 141 from decoder 146, the overlay processor receives and utilizes signals from these sources over lines 1451 and 1452 respectively. The video switch receives outputs from the overlay processor 145, video decoder 146, and audio decoder 147 and provides an appropriate video output over line 1421 depending on the service selectively I/O control 148. Similarly, audio switch and mixer 1481 provides an appropriate audio output (from either or both the receiver 141 and audio decoder 147) depending on the mix selected by I/O control 148. The audio output from the audio switch and mixer 141 and the video output from the video switch and mixer are inputs to the scrambler and tunable modulator 143, the output of which goes onto the feeder for service to a given home interface controller. The control channel interface 1493 obtains and sends data over control bus 139 of FIG. 13. Data obtained from the control bus 139 includes data representing commands from the remote control 14. In addition, the control bus is used to permit data exchange between the processor in the home interface controller land the processor 1496.

Figure 15:
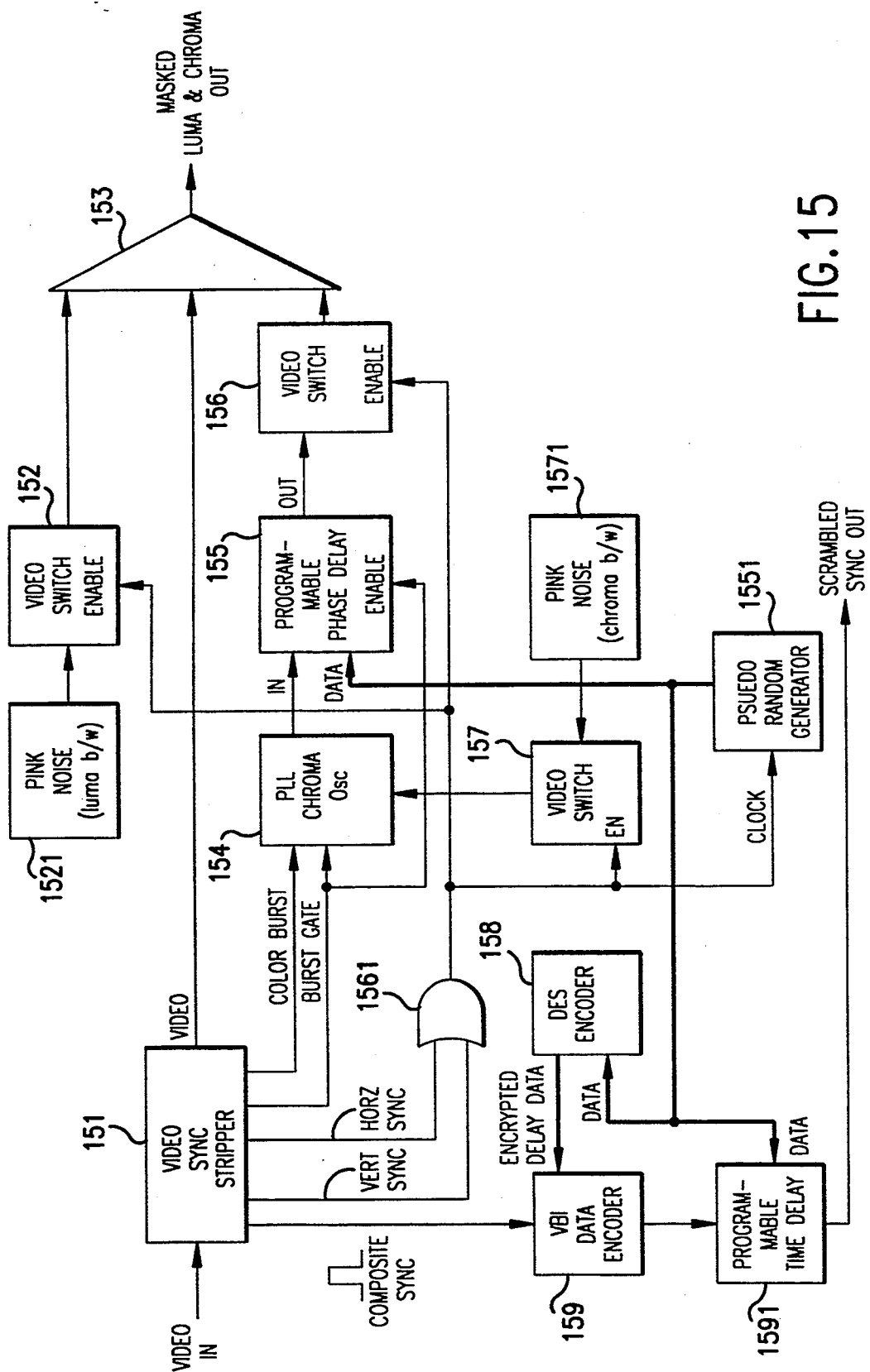
FIG. 15 shows a video scrambling system in accordance with a preferred embodiment of the invention.

FIG. 15 shows the video scrambling system employed in the scrambler and tunable modulator 143 of the feeder server shown in FIG. 14. The system has an NTSC sync stripper 151 that supplies sync stripped video to a mixer 153, which masks sync signals by supplying a chroma subcarrier at all times, including during horizontal and vertical retrace. In addition, the luminance signal is caused to be present at all times.

These results are achieved by using the vertical and horizontal sync outputs from stripper 151 to provide an output from OR gate 1561 when either of both of vertical and horizontal retrace signals are present. This output gates via switch 152 a pink noise luminance masking signal from generator 1521 into the mixer 53. This output also is affected via switch 157 by a pink noise signal from generator 1571 used in turn to modulate phase-locked loop oscillator 154 to produce a modulated chroma subcarrier masking signal. This signal is subject to an optional programmable phase delay 155 to cause different phase shift of the signal during the color burst interval on a line-by-line basis in accordance with a phase offset generated by pseudo random generator 1551. The composite sync signal output from stripper 151 is provided with an encrypted value for the current phase shift caused by generator 1551. The encrypted value is obtained from DES encoder 158, and this encrypted value, a digital signal, is placed on the signal during the vertical blanking interval as a binary pattern by vertical blanking interval data encoder 159. The composite sync signal is then subjected to an optional variable time delay by delay 1591 by a reference value that is also obtained from pseudo random generator 1551. Of course a separate generator could be used, provided that the value obtained from such a generator is also encoded on the composite sync signal. This resultant scrambled composite sync signal is then provided as an output. This system therefore provides a continuously present chroma subcarrier, a continuously present luminance signal, and shifts the color burst by a random amount. The scrambled video is therefore relatively difficult to descramble, without access to the method of scrambling.

Figure 16:
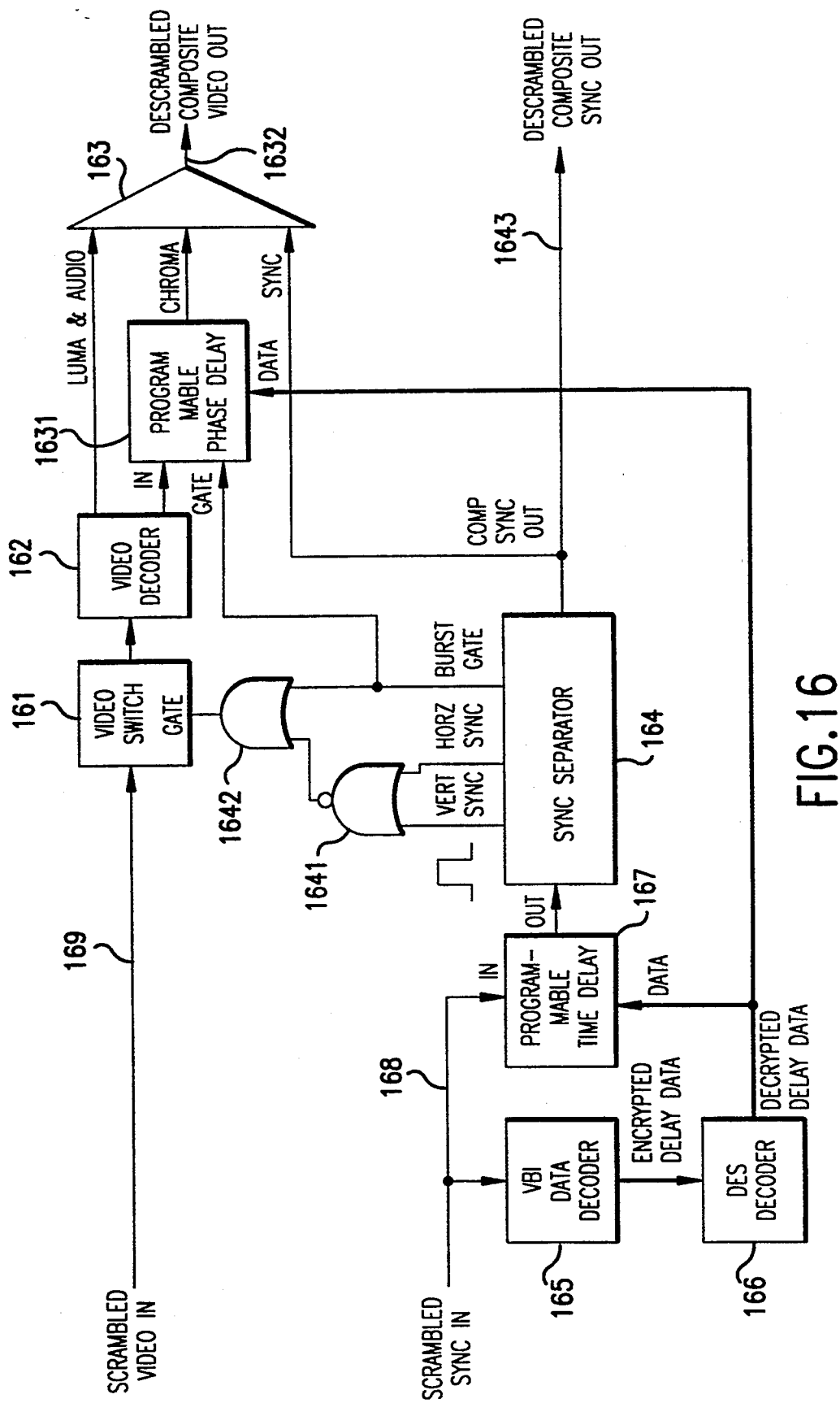
FIG. 16 shows a video descrambling system in accordance with a preferred embodiment of the invention.

FIG. 16 shows a video descrambler system for descrambling the video scrambled in accordance with a system such as shown in FIG. 15. The scrambled video signal provided over line 169 is gated off during both the vertical and the horizontal retrace intervals by gate 161, thereby removing the masking signals that interfere with proper sync, and the proper sync signal, presented on line 1643, is also added to mixer 163 to provide the composite video output over line 1632. The scrambled sync present at input 168 is first used to provide the encrypted delay information (if an encrypted delay is used) which is decoded from the vertical blanking interval data by decoder 165 and deciphered by DES decoder 166. The scrambled sync signal is run through the programmable time delay 167 to provide a composite sync signal that is in phase with the video. Sync separator 164 provides separate outputs for vertical and horizontal sync as well as a gate signal for the color burst. The vertical and horizontal sync signals are run through NOR gate 1641 and OR gate 1642, so that 161 gates off the video during vertical and horizontal retrace except during color burst. Optional video decoder 162 separates the chroma subcarrier (in the event that it is phase shifted), and the separated subcarrier is run through optional programmable phase delays 1631 in an amount specified by the decrypted delay data to recover the original phase of the subcarrier. The resultant corrected subcarrier is mixed with the luminance and audio subcarrier and the composite sync signal by mixer 163 to provide a descrambed composite video signal over line 1632.

Figure 17:
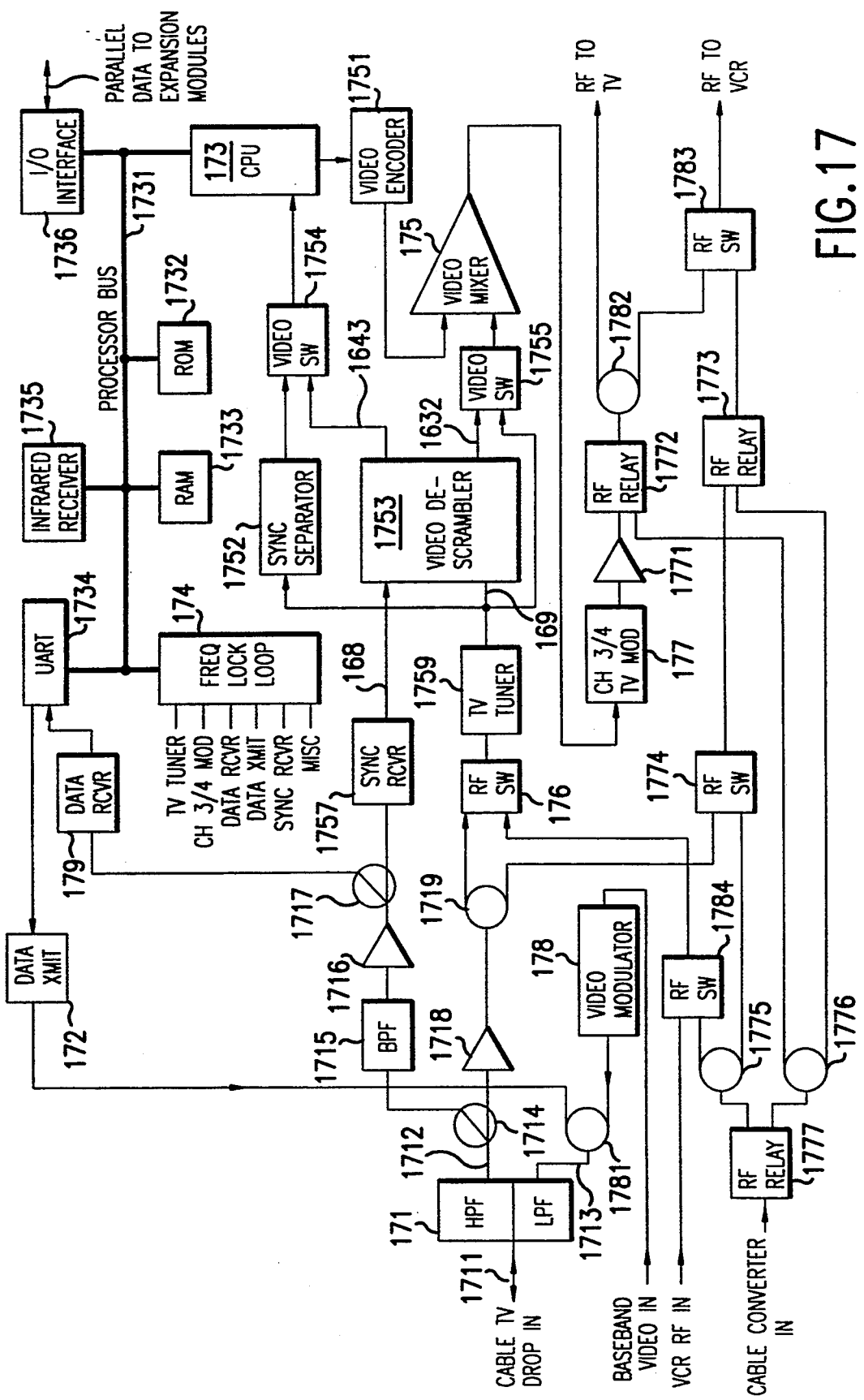
FIG. 17 is an illustration of use of the home interface control unit in accordance with a preferred embodiment of the invention.

FIG. 17 shows a home interface controller in accordance with a preferred embodiment of the invention. The cable television signal from the drop to the subscriber's home enters on line 1711. A filter arrangement 171 includes a duplex filter. The high pass filter portion of the duplex filter has an output on line 1712 connected to directional coupler 1714, so as to produce a small signal output that, after going through a band pass filter 1715 and amplifier 1716, runs through a sync receiver 1715 to provide a sync input over line 168 to the video descrambler 1753. It also provides an input to data receiver 179 via directional coupler 1717 for data communications with the node and headend. A related data transmitter 172 provides a signal to power divider 1781, the output of which goes over line 1713 through the low pass portion of the duplex filter and then via line 1711 to the cable TV drop for data communications with the node and headend. The data that runs through the transmitter 172 may be optionally encrypted, prior to transmission (for example, in software, by CPU 173) and decrypted after being received by receiver 179 (also, for example, by CPU 173). Data control by the home interface controller is achieved by CPU 173 operating over processor bus 1731 in connection with RAM 1732, used to boot strap the CPU into obtaining instructions from the node and headend, and RAM 1733. The CPU receives commands from infrared receiver 1735, which is in communication with remote unit 14. UART 1734 provides serial communications, via the data transmitter 172 and receiver 179, with the node's feeder server shown in FIG. 14. Communication among the CPU, ROM, RAM, infrared receiver, and UART 1734 is over processor bus 1731. An interface 1736 permits data communications with expansion modules. The home interface controller of FIG. 17 provides a means for bypass of its circuitry by means of rf relays 1777, 1773, and 1772. In the event of a power loss to the controller of other failure, the relay coils are depowered, causing their switches to be toggled. Depowering can be achieved by providing a watchdog circuit, in a manner known in the art, in which the relays will be held in powered mode as long as the watchdog receives a periodic pulse; failure of the pulse (indicated a CPU failure) causes the watchdog to depower the relays. When the relays are depowered, the signal flow is from the standard cable converter output, which is an input to rf relay 1777. (The standard cable converter can be connected via a splitter to the cable TV drop.) Then the output of relay 1777 goes to splitter 1776 and through relays 1772 and 1773 to the TV and VCR respectively.

When the home interface controller is operating, the video may or may not be scrambled, depending on the information service selected. If the video is not scrambled, the video descrambler 1753 is by-passed by video switch 1755. Sync signal for any overlay is obtained from separator 1752 or the descrambler, depending on whether the video is scrambled, via video switch 1754. In any event, the output of video switch 1755 is mixed by video mixer 175 with any video overlay output provided by video encoder 1751 from CPU 173 (and ultimately from the node's feeder server). This mixed video is then modulated so as to be carried at the selectable channel 3 or channel 4 frequency and provided as an rf output to the television and to the VCR via splitter 1782. The rf switch 1783 permits the VCR to be connected to either the signal currently being provided as an output to the TV or to the cable converter output.

Figure 18:
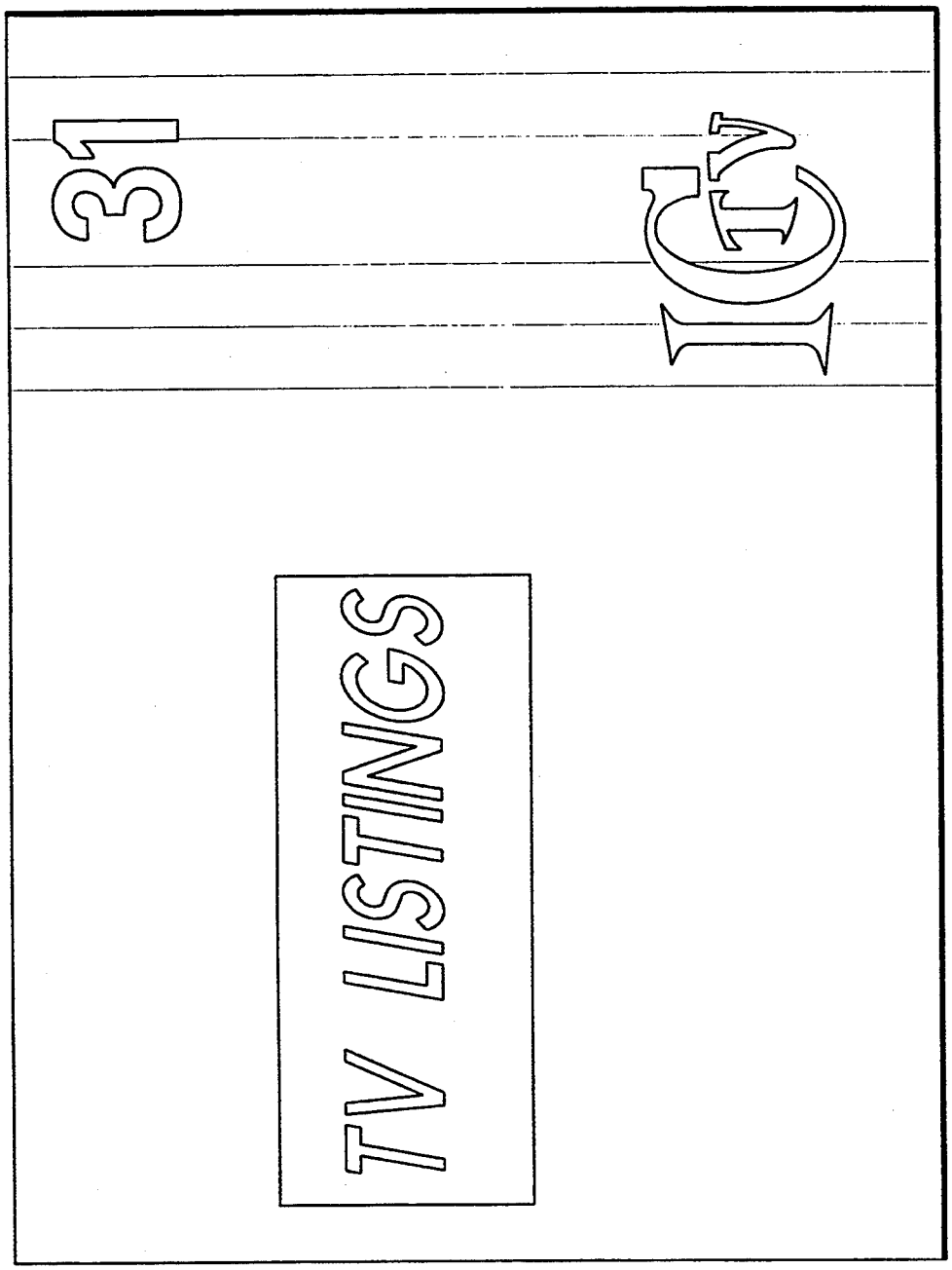
FIGS. 18 and 19 illustrate use of the channel menu system in accordance with a preferred embodiment of the invention.
Figure 19:
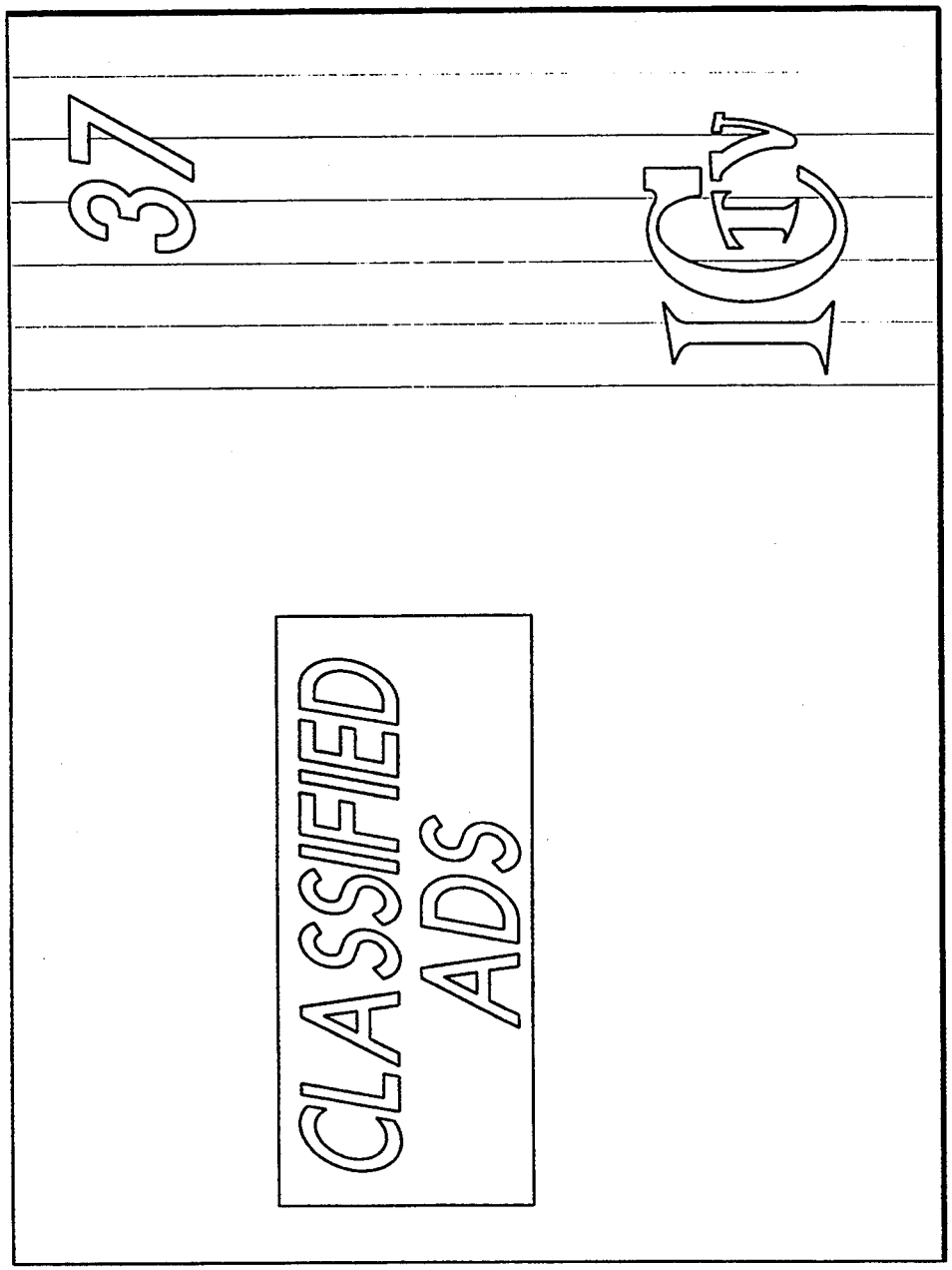

FIGS. 18 and 19 show apparently different channels used for different information services, here TV listings (channel 31) and classified advertisements (channel 37), even though in the manner described previously, the frequency over which the home interface control unit receives information that has not changed. The term "different information service" as used in this description and in the claims following can mean any information service in a mode appearing to be different to the subscriber, including an interactive service in a different information area, or a different interactive service, or a different television broadcast signal provided by the headend, etc.

Figure 20:
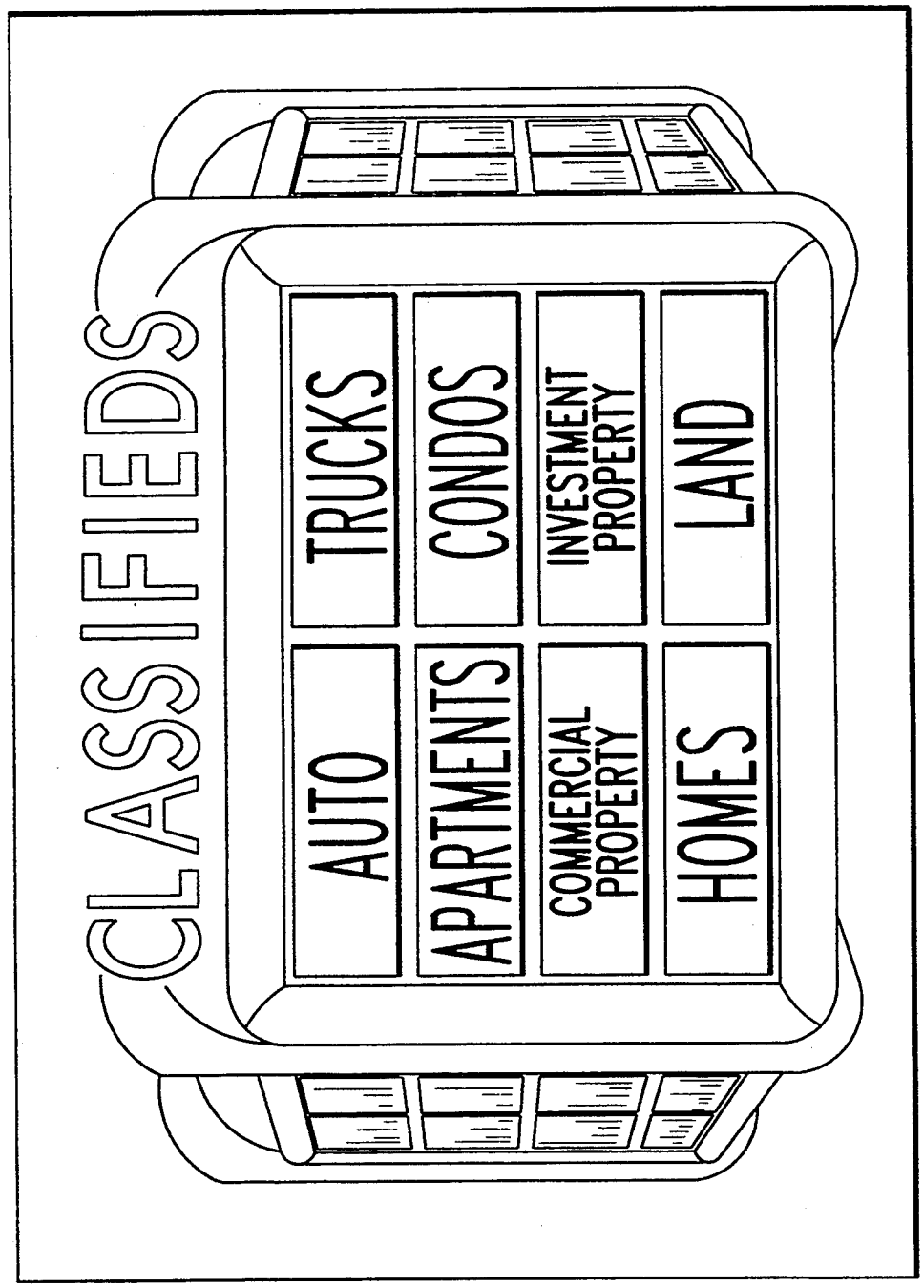
Figure 22:
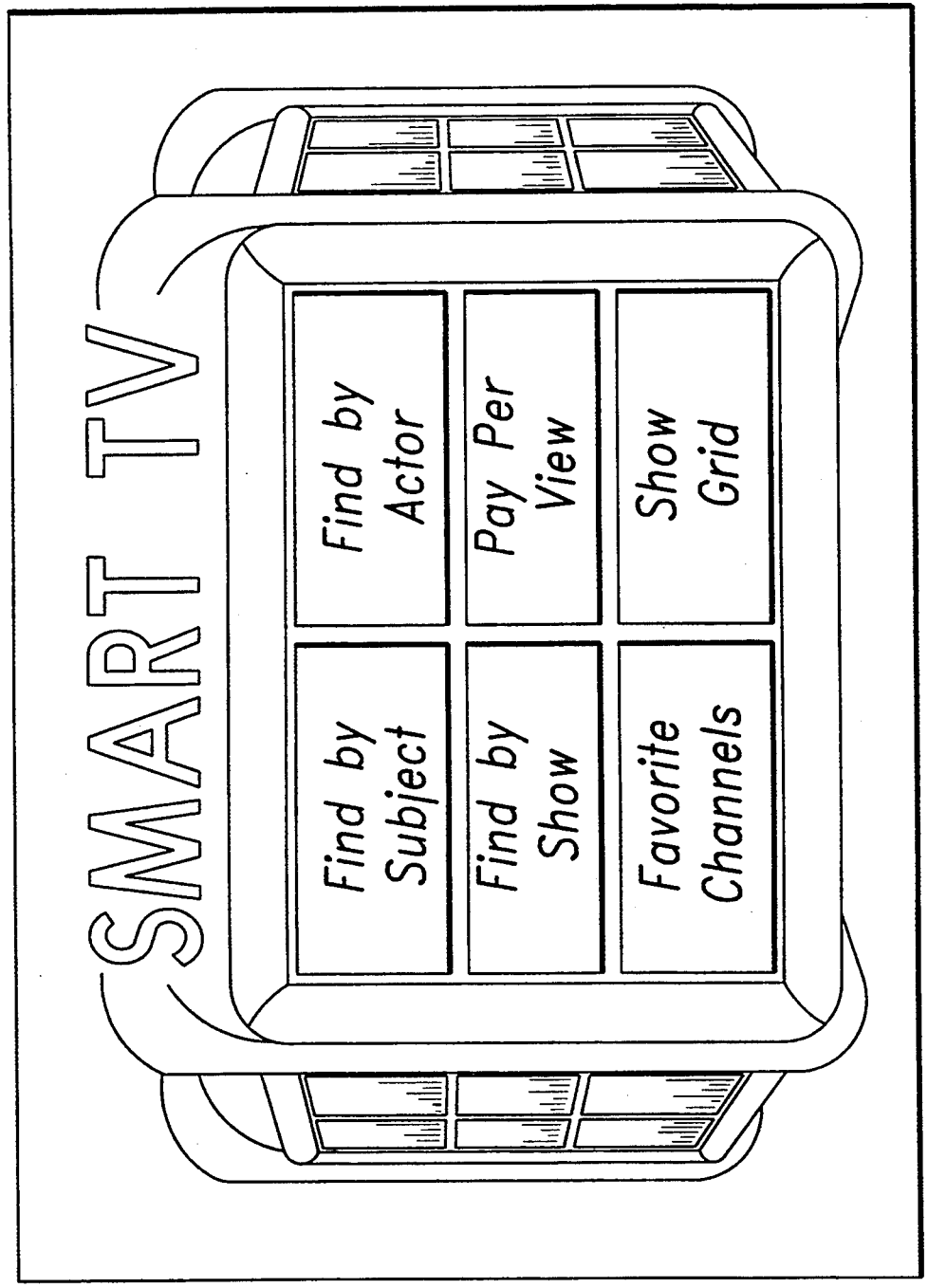

FIG. 20 illustrates an embodiment of the carousel menu system in accordance with the invention when an interactive information service has been selected. (In this case, the interactive service is classified advertisements.) The carousel here shows three faces, one of which is a frontal face. The frontal face shows one or more menu choices. The two side faces shown are greeked, so as to display the apparent availability of other choices if the carousel is caused to rotate so that one of the side faces is moved to the frontal position. A cursor can be moved over the television display by the remote unit 14, and when the cursor overlays the menu choice of interest, the choice may be selected by pushing the appropriate button on the remote unit 14. Depending on the choice selected (and if subchoices are required by the area of interest in particular interactive information service), the carousel is momentarily shown to be apparently rotated in one direction or another, and thereafter another set of choices is caused to appear on the frontal face, the flanking side faces again being greeked.

FIGS. 21 through 26 illustrate how interactive television service may be provided in accordance with a preferred embodiment of the invention. If TV listings (here channel 31) has been selected, there is displayed a grid portion, which can be shifted on screen for viewing the grid in the entirety. Shown in FIG. 21 is a portion of the grid display, plotting television programs as a function of channel and time for a given date and portion of the day; and the date and portion of the day can be selected by the subscriber.

Figure 23:
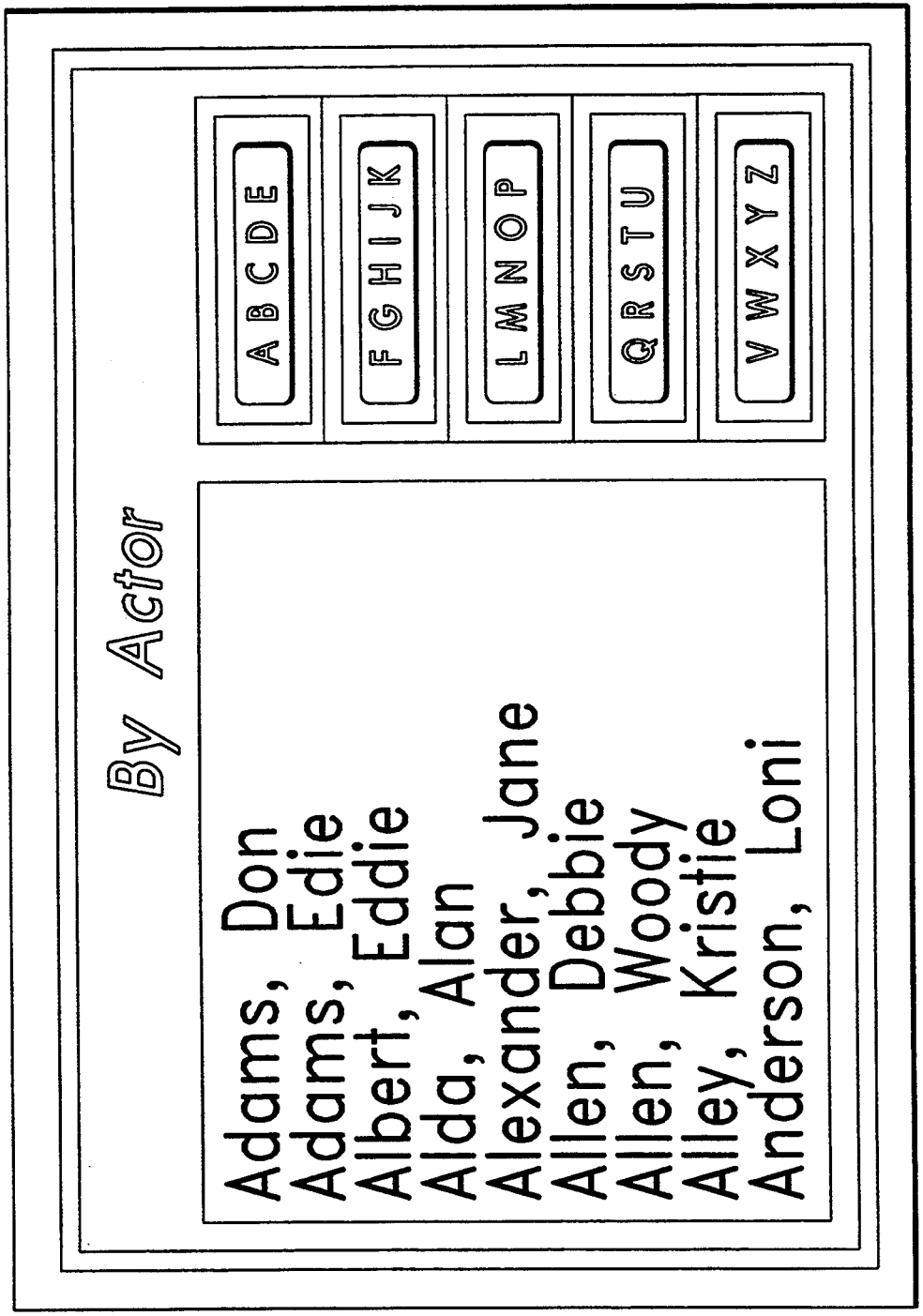
Figure 24:
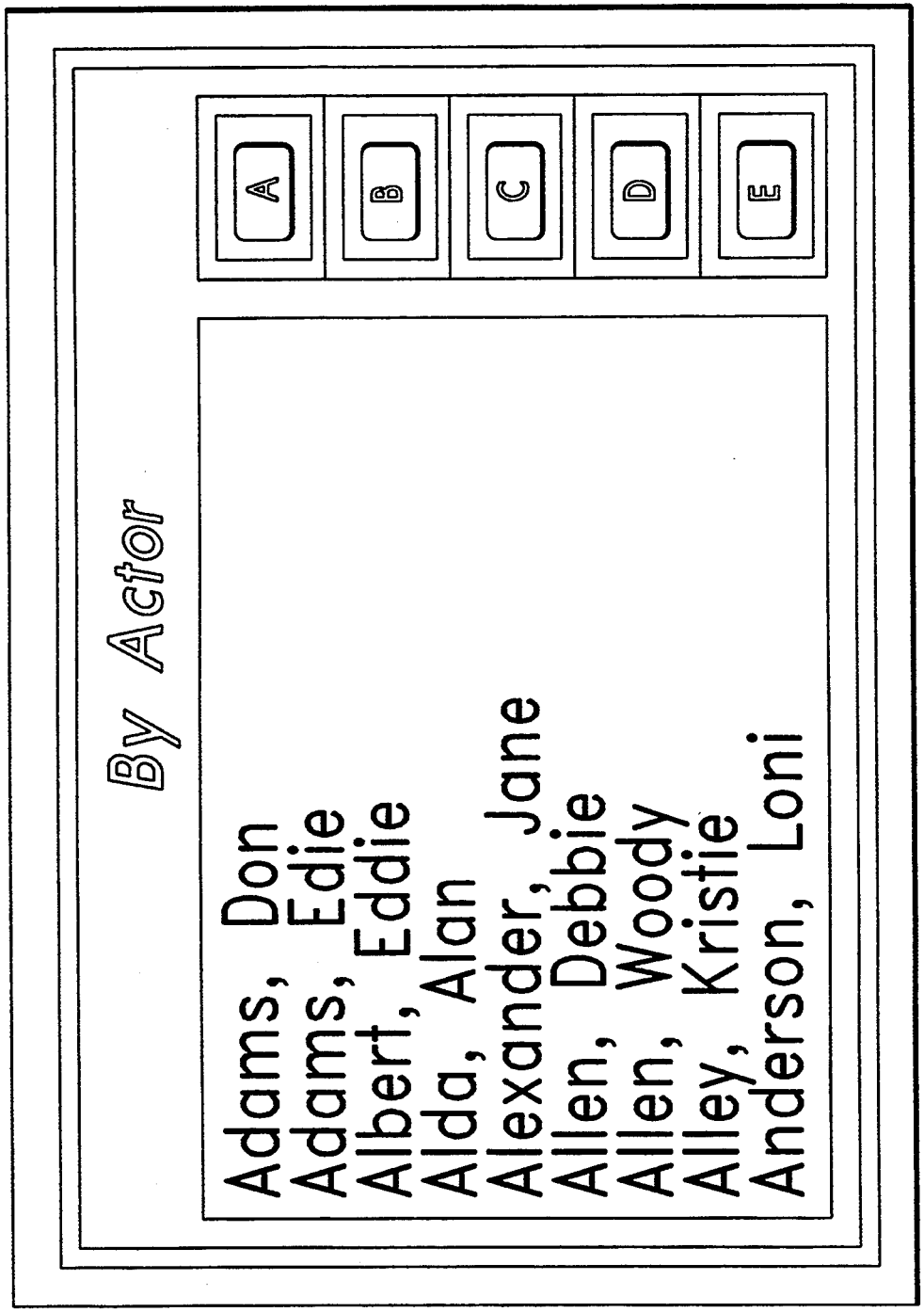
Figure 25:
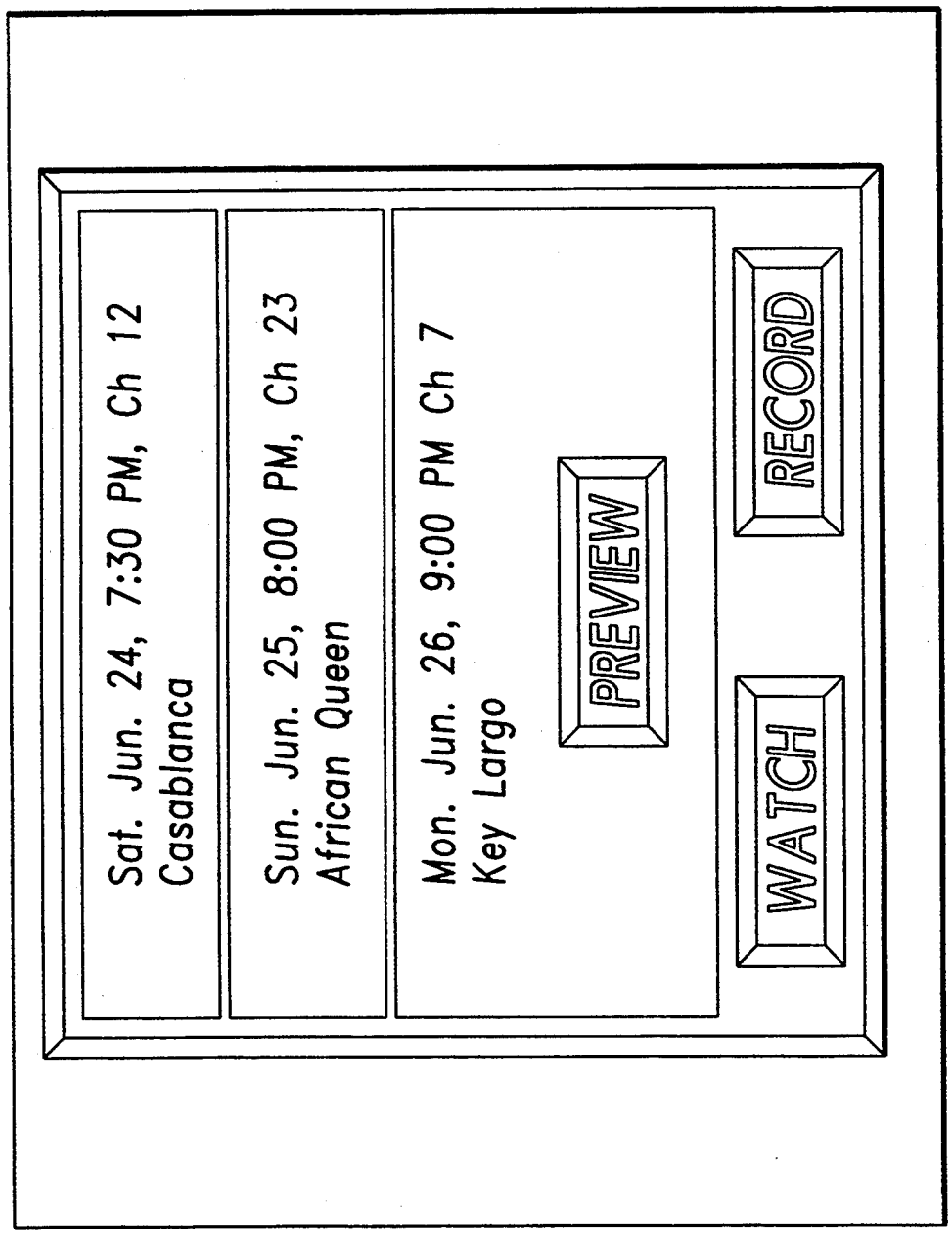
Figure 26:
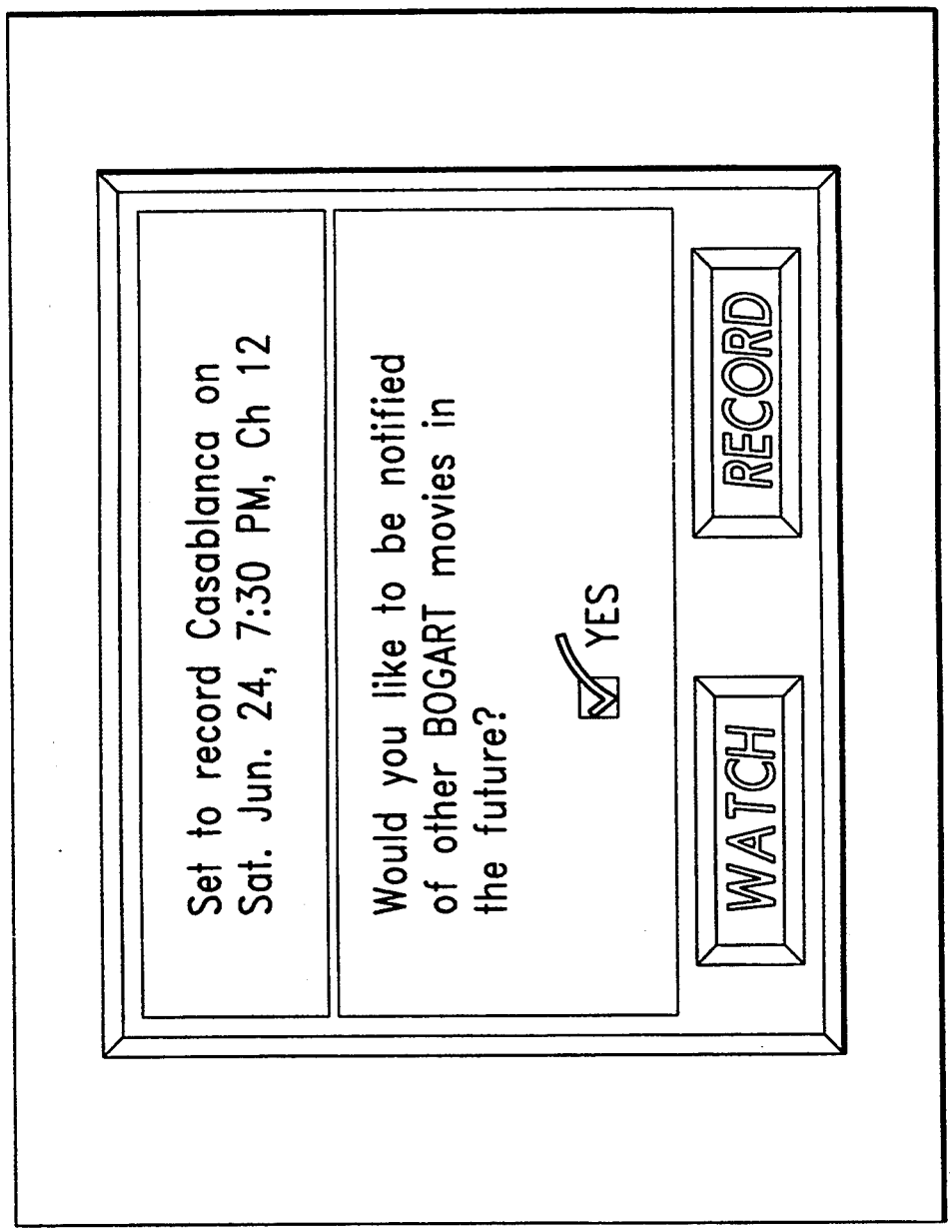

The "Smart TV" selection permits the subscriber to search for programs or other information service offerings in the manner illustrated in subsequent figures. The carousel choices indicated in FIG. 22 permit the subscriber to find programs and movies by subject, by show, or by actor. Other choices permit the subscriber to program his favorite channels and find offerings on those channels, or to identify offerings on a pay per view basis, or to return to the grid of FIG. 21. If the "by actor" selection is made, the alphabetical menu of FIG. 23 is presented. To find listings for "Bogart", the top button "ABCDE" would be selected, producing the display of FIG. 24. Thereafter, the "B" button would be selected, and from the list of actors whose names beginning with "B" are displayed, one could select "Bogart", and eventually produce the listing and choices shown in FIG. 25. One could, for example, chose to record Casablanca on June 24, producing the display of FIG. 26, including the choice of being notified of other Bogart movies in the future.

What is claimed is:

1. A node for use in an interactive cable television environment, the node comprising:
    a headend port for communication with a cable headend;
    a feeder port, including at least one receiver and transmitter, for communication with a plurality of home interface controllers, each home interface controller having a radio frequency input and a data communications link with the at least one receiver and transmitter in the feeder port;
    a plurality of feeder server means, each feeder server means in communication with the headend port and the feeder port, for providing one of a plurality of information services depending on a selection input, each information service having at least an information output, each feeder server means including modulator means for providing the information output of a selected service at a selected carrier frequency to the feeder port;
    node control means, in communication with the feeder port, for determining whether a home interface controller is active based on information received over the data communications link and, in the event the home interface controller is determined to be active, for assigning a feeder server means to it during the time such interface controller is determined to be active.

2. A node according to claim 1, wherein each feeder server means further includes means for demodulating and decompressing a compressed video information radio frequency signal received at the headend port.

3. A node according to claim 1, wherein:
    with each home interface controller there is associated a remote unit having controls for moving a cursor displayed on a television connected to the controller and for making a selection; and
    each feeder server means further includes interactive means (i) for providing, based on information received over the data communications link, a video information signal causing a display, on a television connected to a home interface controller to which the feeder server has been assigned by the node control means, that permits the viewer thereof to move the cursor thereon and make a selection and (ii) for communicating data to and from the headend to permit the viewer to obtain interactive television service.

4. A node according to claim 1, wherein:
    the information output includes an NTSC signal source; and
    each feeder server means further includes:
        stripper means for removing the sync signal from the source to provide a sync-stripped output signal;
        subcarrier means for maintaining the chroma subcarrier on the sync-stripped output signal at all times including the periods of horizontal and vertical retrace to provide a resultant scrambled signal;
        first modulator means for supplying the resultant scrambled signal at a first carrier frequency to the feeder port; and
        second modulator means for supplying the sync signal stripped by the stripper means at a second carrier frequency to the feeder port.

5. A node according to claim 4, wherein, each feeder server further includes luminance mask generator means for providing a false luminance signal during the periods of horizontal and vertical retrace.

6. A node according to claim 4, wherein the second carrier frequency is approximately 50 MHz.

7. A system for providing a scrambled signal over a cable television system from a television signal source comprising:
    stripper means for removing the sync signal from the source to provide a sync-stripped output signal;
    subcarrier means for maintaining the chroma subcarrier on the sync-stripped output signal at all times including the period of vertical retrace;
    first modulator means for supplying the resultant scrambled signal at a first carrier frequency over the cable system; and
    second modulator means for supplying the sync signal stripped by the stripper means at a second carrier frequency over the cable system.

8. A system according to claim 7, further comprising;
    luminance mask generator means for providing a false luminance signal during the periods of horizontal and vertical retrace.

9. A system according to claim 7, wherein the second carrier frequency is approximately 50 MHz.

10. A system, for decoding a composite scrambled television signal that includes a first carrier, at a first frequency, modulated with a sync-stripped video signal with a continuously present chroma subcarrier and a second carrier, at a second frequency, modulated with the stripped sync signal, the system comprising:
    first demodulator means for demodulating the sync-stripped signal at the first frequency and having an output;
    second demodulator means for demodulating the stripped sync signal at the second frequency and having an output; and
    combining means for combining the outputs of the first and second demodulator means in such a way as to restore the television signal.

11. A system according to claim 10, wherein the second frequency is approximately 50 MHz.

12. A cable television system permitting interactive television service, comprising:
    a cable system having a headend and trunk and feeder cables and taps thereon for providing information service to subscribers, with the cable system having an upper frequency limit for carrying analog television signals with acceptable quality from the headend up to the taps;
    source means for providing at least one digitally compressed video signal at the headend;
    modulator means at the headend for supplying the digitally compressed video signal over the cable system at a carrier frequency greater than the upper frequency limit.

13. A cable television system according to claim 12, wherein the source means includes means for providing a plurality of digitally compressed video signals, and further comprising mux means for multiplexing the digitally compressed video signals, wherein the modulator means includes means for supplying the multiplexed video signals at a carrier frequency greater than the upper frequency limit.

14. A cable television system according to claim 13, further comprising at least one node located at a feeder, the node including:

a headend port for communication with a cable headend;

a feeder port for communication with a plurality of home interface controllers, each home interface controller having a radio frequency input and a data communications link with the feeder port;

a plurality of feeder server means, each feeder server means in communication with the headend port and the feeder port, for providing one of a plurality of information services depending on a selection input, each information service having at least an information output, each feeder server means including modulator means for providing the information output of a selected service at a selected carrier frequency to the feeder port; and means for demodulating, demultiplexing and decompressing the multiplexed video signals received at the headend port.

15. A cable television system according to claim 14, wherein each feeder server means further includes node control means, in communication with the feeder port, for determining whether a home interface controller is active based on information received over the data communications link and, in the event the home interface controller is determined to be active, for assigning a feeder server means to it during the time such interface controller is determined to be active.

16. A cable television system permitting interactive television service comprising:

a cable system having a headend and trunk end feeder cables for providing information service to subscribers;

service means at the headend for providing a plurality of digitally compressed video signals;

mux means at the headend for multiplexing the digitally compressed video signals;

modulator means at the headend for supplying the multiplexed video signals on a radio frequency carrier; and at least one node located proximately at a feeder, said node including:

a headend port for communication with the cable headend;

a feeder port for communication with a plurality of home interface controllers, each home interface controller having a radio frequency input and a data communications link with the feeder port; and a plurality of feeder server means, each feeder server means in communication with the headend port and the feeder port, for providing one of a plurality of information services depending on a selection input, each information service having at least an information output, each feeder server means including:

modulator means for providing the information output of a selected service at a selected radio frequency to the feeder port;

download means for demodulating, demultiplexing and decompressing the multiplexed video signals received at the headend port; and node control means, in communication with the feeder port, for determining whether a home interface controller is active based on information received over the data communications link, and, in the event the home interface controller is determined to be active, for assigning a feeder server means to it during the time such interface controller is determined to be active.

* * * * *